(12) United States Patent
Misaki et al.

(10) Patent No.: US 8,059,252 B2
(45) Date of Patent: Nov. 15, 2011

(54) LIQUID CRYSTAL DISPLAY DEVICE AND MANUFACTURING METHOD THEREOF

(75) Inventors: Katsunori Misaki, Tottori (JP); Manabu Sawasaki, Tottori (JP); Yoshio Kurosawa, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 699 days.

(21) Appl. No.: 11/420,877

(22) Filed: May 30, 2006

(65) Prior Publication Data

US 2006/0285060 A1  Dec. 21, 2006

(30) Foreign Application Priority Data

May 27, 2005  (JP) .................................. 2005-155629

(51) Int. Cl.
  *G20F 1/1339* (2006.01)
(52) U.S. Cl. ........................ 349/155; 349/156; 349/157
(58) Field of Classification Search ........... 349/155–157
  See application file for complete search history.

(56) References Cited

U.S. PATENT DOCUMENTS

| | | | | |
|---|---|---|---|---|
| 6,337,730 | B1* | 1/2002 | Ozaki et al. ................. | 349/156 |
| 6,522,379 | B1 | 2/2003 | Ishihara et al. | |
| 6,657,699 | B2* | 12/2003 | Matsumoto ................. | 349/156 |
| 6,690,445 | B2* | 2/2004 | Matsumoto ................. | 349/155 |
| 7,352,429 | B2* | 4/2008 | Tseng et al. ................. | 349/156 |
| 7,375,776 | B2* | 5/2008 | Yeh et al. .................... | 349/156 |
| 7,385,666 | B2* | 6/2008 | Ashizawa et al. ........... | 349/156 |
| 2001/0026347 | A1 | 10/2001 | Sawasaki et al. | |
| 2002/0089636 | A1* | 7/2002 | Kang et al. ................. | 349/156 |
| 2002/0113935 | A1 | 8/2002 | Yanagawa et al. | |
| 2004/0223109 | A1* | 11/2004 | Taniguchi et al. .......... | 349/156 |
| 2005/0237470 | A1* | 10/2005 | Kadotani .................... | 349/155 |
| 2005/0243262 | A1* | 11/2005 | Kim et al. ................... | 349/156 |
| 2005/0264749 | A1* | 12/2005 | Lee ............................. | 349/156 |

FOREIGN PATENT DOCUMENTS

| | | |
|---|---|---|
| JP | 10-039318 A | 2/1998 |
| JP | 11-153798 A | 6/1999 |
| JP | 2000-214469 A | 8/2000 |
| JP | 2000-227596 A | 8/2000 |
| JP | 2001-133787 A | 5/2001 |
| JP | 2001-201750 A | 7/2001 |
| JP | 2001-222234 A | 8/2001 |
| JP | 2001-305557 A | 10/2001 |
| JP | 2002-082337 A | 3/2002 |
| JP | 2002-169160 A | 6/2002 |
| JP | 2002-341354 A | 11/2002 |
| JP | 2003-005190 A | 1/2003 |
| JP | 2003-156750 A | 5/2003 |
| JP | 2004-287058 A | 10/2004 |
| JP | 2005-128357 A | 5/2005 |
| JP | 2005-338770 A | 12/2005 |
| JP | 2006-085123 A | 3/2006 |

* cited by examiner

*Primary Examiner* — Mark Robinson
*Assistant Examiner* — Charles Chang
(74) *Attorney, Agent, or Firm* — Keating & Bennett, LLP

(57) ABSTRACT

The invention relates to a liquid crystal display device that is used in display portions of electronics devices and a manufacturing method thereof, and an object is to provide a high quality liquid crystal display device where light is inhibited from leaking and a manufacturing method thereof. The projected structure formed of the first through the fourth columnar spacer receiving patterns, the insulating film and the final protective film is formed on the TFT substrate. The projected structure is buried in the columnar spacer disposed on the opposite substrate. Thereby, even when the liquid crystal display panel is surface pressed, both substrates are hardly displaced.

7 Claims, 14 Drawing Sheets

LIQUID CRYSTAL DISPLAY DEVICE AND MANUFACTURING METHOD THEREOF

BACKGROUND OF THE INVENTION

1. Field of the Invention

The invention relates to a liquid crystal display device that is used in display portions of electronics devices and a manufacturing method thereof.

2. Description of the Related Art

A liquid crystal display device is advantageous in comparison with a CRT (Cathode Ray Tube) in that it is thin, light, capable of driving at lower voltages and low in the power consumption. Accordingly, the liquid crystal display device is used in display portions of various kinds of electronics devices such as TV receivers, note-type PCs (personal computers), desktop computers, PDAs (portable terminal assistants) and portable telephones. In particular, an active matrix liquid crystal display device where a TFT (Thin Film Transistor) is disposed as a switching element to each of pixels (sub-pixels) shows excellent display characteristics comparative to the CRT owing to high drivability and has become being widely used in fields where CRTs have been used such as desktop computers and TV receivers.

A liquid crystal display device generally has two substrates provided with a transparent electrode and a liquid crystal layer disposed therebetween. In the liquid crystal display device, a predetermined voltage is applied between the transparent electrodes to drive the liquid crystal and thereby to control the light transmittance of each of pixels to obtain a desired display. In recent years, a demand for liquid crystal display devices is increasing and requirements for liquid crystal display devices are becoming versatile. Among the requirements, an improvement in display quality is particularly strong. In order to obtain excellent display that is free from brightness irregularity, a technology where columnar spacers are formed on a substrate to control a thickness of a liquid crystal layer (cell gap) uniformly is becoming a main stream.

Existing columnar spacers are disposed in a predetermined arrangement pattern in a substrate plane. With the columnar spacers, a gap between a thin film transistor (TFT) substrate and an opposite substrate disposed opposite to the TFT substrate that are mutually adhered is supported. As a columnar space forming material, a resin material such as an acrylic resin or a novolak resin is generally used. However, the resin materials have an elastic deformation region and a plastic deformation region based on their physicality. When a localized force is externally applied on a liquid crystal display panel, the columnar spacers show plastic deformation and do not return to an original height even after the localized force is eliminated. Accordingly, at a weight-applied portion where the localized force is applied, the irregularity of the cell gaps are caused.

In order to inhibit the cell gap irregularity from occurring, the liquid crystal display panel may well be hardened by increasing the number of spacers or making an area of the column of the columnar spacer larger. However, when the density of the columnar spacers is made too high, when a volume of the liquid crystal decreases under low temperatures, the columnar spacers cannot follow to deform. Accordingly, there is a problem in that, inside of the liquid crystal display panel, a vacuum area is generated and therein an air bubble is generated. As a result, the arrangement density of the columnar spacers cannot be increased so high, that is, there is a restriction on the arrangement density. With the columnar spacers having the arrangement density under the restriction, the resistance of the cell gaps against the external localized force cannot be sufficiently obtained.

In order to overcome the foregoing problems, a patent document 1 discloses a technology where two kinds of columnar spacers different in height are formed. Furthermore, a patent document 2 discloses a technology where columnar spacers are arranged in two or more kinds of arrangement patterns, and, by making use of a step of a film thickness on a TFT substrate side, substrates are stacked to form two kinds of columnar spacers substantially different in height. Liquid crystal display devices described in patent documents 1 and 2, being provided with first columnar spacers that maintain the cell gap at room temperature and low temperature and second columnar spacers for maintaining the cell gap when the localized force is applied, has a structure that does not generate air bubbles at low temperatures and can withstand the externally applied localized force as well.

[Patent document 1] JP-A-2001-201750
[Patent document 2] JP-A-2003-156750

However, when a liquid crystal display panel of a liquid crystal display device is surface pressed, a displacement is caused between the TFT substrate and the opposite substrate to result in light leakage.

SUMMARY OF THE INVENTION

An object of the invention is to provide a high quality liquid crystal display device where light is inhibited from leaking and a manufacturing method thereof.

The object can be achieved with a liquid crystal display device that includes a first substrate and a second substrate that are disposed facing each other; a liquid crystal sealed between the first and the second substrates; a columnar spacer disposed on the first substrate so as to hold a cell gap between the first and the second substrates; and a projected structure that is formed on the second substrate and provided with columnar spacer receivers having at least two kinds of heights.

Furthermore, the object can be achieved with a liquid crystal display device that includes a first substrate and a second substrate that are disposed facing each other; a liquid crystal sealed between the first and the second substrates; a columnar spacer disposed on the first substrate so as to hold a cell gap between the first and the second substrates; a columnar spacer contact portion that is formed on the second substrate and provided with a columnar spacer receiver and with which the columnar spacer comes into contact; and a columnar spacer periphery portion that is formed on the second substrate higher than the columnar spacer contact portion in the periphery of the columnar spacer contact portion and disposed in the periphery of the columnar spacer.

Still furthermore, the object can be achieved with a liquid crystal display device that includes a first substrate and a second substrate that are disposed facing each other; a liquid crystal sealed between the first and the second substrates; a columnar spacer disposed on the first substrate so as to hold a cell gap between the first and the second substrates; a columnar spacer contact portion that is formed on the second substrate and provided with a columnar spacer receiver and comes into contact with the columnar spacer; a columnar spacer that is formed on the first substrate and does not come into contact with the columnar spacer receiver on the second substrate; and a columnar spacer periphery portion that is formed on the second substrate so as to be higher than a tip end portion of the columnar spacer and disposed in the periphery of the columnar spacer.

The liquid crystal display device according to the invention is characterized in that the projected structure is formed with at least one layer of a gate layer, a gate insulating film layer, a semiconductor layer, a contact layer, a drain layer (data layer), a passivation film layer, an overcoat layer, a pixel electrode, a reflection/diffusion layer and a reflection electrode, all of which are disposed on the second substrate, or at least one layer of a black matrix layer, a CF layer, a common electrode layer and a domain controlling projection layer, all of which are disposed on the second substrate.

The liquid crystal display device according to the invention is characterized in that the projected structure is an isolated pattern and at least part of the projected structure is formed into a structure where an area of lower layer portion is larger than an area of upper layer portion.

The liquid crystal display device according to the invention is characterized in that the projected structure is buried in the columnar spacer.

The liquid crystal display device according to the invention is characterized in that a plurality of the projected structures is disposed.

The liquid crystal display device according to the invention is characterized in that a plurality of the projected structures is formed into different shapes.

The liquid crystal display device according to the invention is characterized in that the columnar spacer periphery portion is formed with at least one layer of a gate layer, a gate insulating film layer, a semiconductor layer, a contact layer, a drain layer (data layer), a passivation film layer, an overcoat layer, a pixel electrode, a reflection/diffusion layer and a reflection electrode layer, all of which are disposed on the second substrate, or with at least one layer of a black matrix layer, a CF layer, a common electrode layer and a domain controlling projection layer, all of which are disposed on the second substrate.

The liquid crystal display device according to the invention is characterized in that the columnar spacer periphery portion is a predetermined bus line or a predetermined electrode, which is formed on the second substrate.

The liquid crystal display device according to the invention is characterized in that the columnar spacers are disposed on at least two different positions to the pattern of the second substrate.

The liquid crystal display device according to the invention is characterized in that the columnar spacer periphery portion is formed so as to be a throughhole structure.

The liquid crystal display device according to the invention is characterized in that the columnar spacer receivers disposed on the second substrate are formed different in height.

The liquid crystal display device according to the invention is characterized in that the columnar spacers having different shapes are plurally disposed.

The liquid crystal display device according to the invention is characterized in that the columnar spacers having different hardness are plurally disposed.

Furthermore, the object can be achieved with a manufacturing method of a liquid crystal display device, which, in a manufacturing method of a liquid crystal display device that includes a first substrate and a second substrate that are disposed facing each other, a liquid crystal sealed between the first and the second substrates and a columnar spacer disposed on the first substrate so as to hold a cell gap between the first and the second substrates, includes forming a projected structure that has columnar spacer receivers having at least two kinds of heights on the second substrate in a TFT formation process or a CF formation process.

Still furthermore, the object can be achieved with a manufacturing method of a liquid crystal display device, which, in a manufacturing method of a liquid crystal display device that includes a first substrate and a second substrate that are disposed facing each other, a liquid crystal sealed between the first and the second substrates and a columnar spacer disposed on the first substrate so as to hold a cell gap between the first and the second substrates, includes forming a columnar spacer periphery portion that is disposed in the periphery of the columnar spacer so as to be higher than the columnar spacer contact portions with which the columnar spacer comes into contact on the second substrate in a TFT formation process or a CF formation process.

Furthermore, the object can be achieved with a manufacturing method of a liquid crystal display device, which, in a manufacturing method of a liquid crystal display device that includes a first substrate and a second substrate that are disposed facing each other, a liquid crystal sealed between the first and the second substrates and a columnar spacer disposed on the first substrate so as to hold a cell gap between the first and the second substrates, includes forming a columnar spacer periphery portion that is disposed in the periphery of the columnar spacer so as to be higher than a tip end of the columnar spacer on the second substrate in a TFT formation process or a CF formation process.

The invention can realize a high quality liquid crystal display device where light is inhibited from leaking.

DESCRIPTION OF THE PREFERRED EMBODIMENTS

First Embodiment

Figure 1:
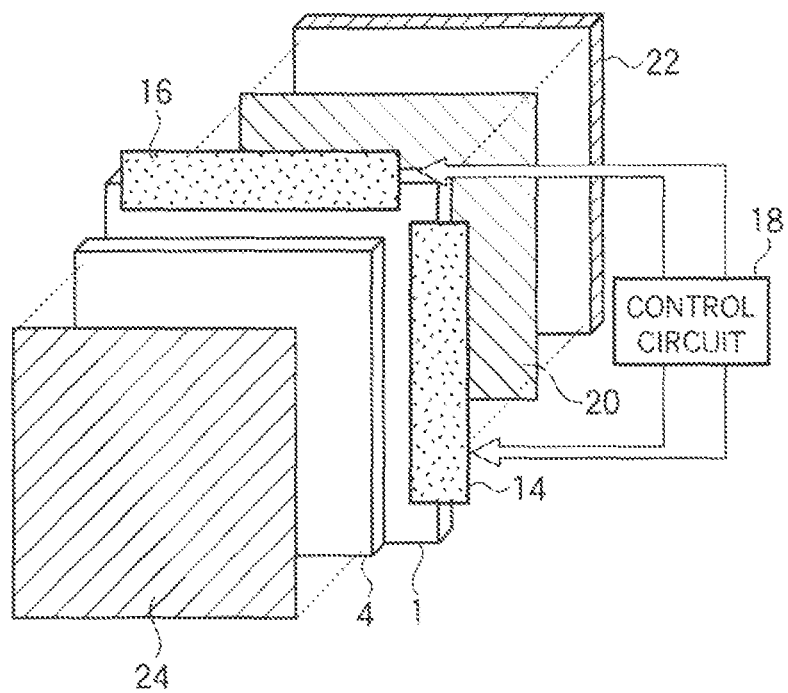
FIG. 1 is a diagram showing a schematic configuration of a liquid crystal display device according to a first embodiment of the invention.
Figure 2:
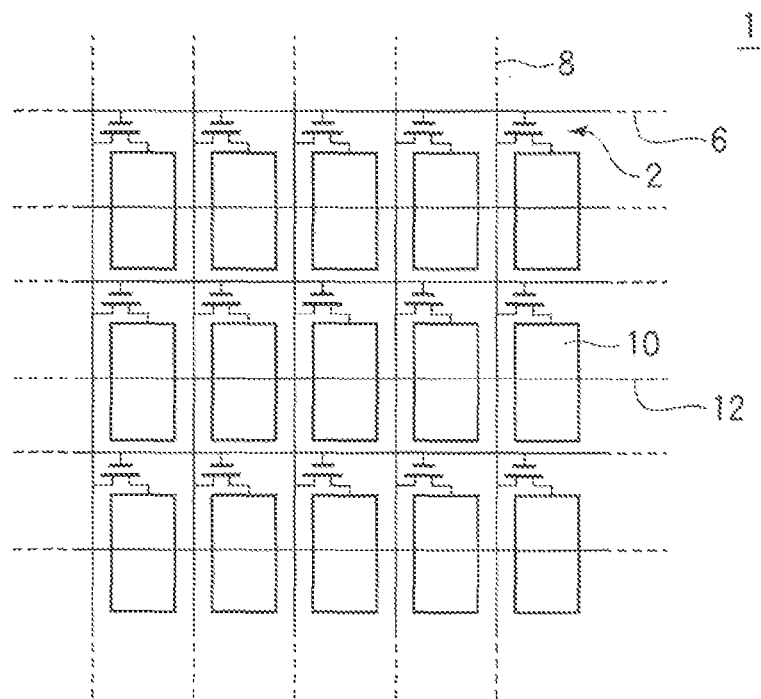
FIG. 2 is a diagram showing an equivalent circuit of an element formed on a TFT substrate 1 used in the liquid crystal display device according to the first embodiment of the invention.

A liquid crystal display device according to a first embodiment of the invention and a manufacturing method thereof will be described with reference to FIGS. 1 through 6. In the beginning, a schematic configuration of the liquid crystal display device according to the embodiment will be described with reference to FIGS. 1 through 3. FIG. 1 shows a schematic configuration of the liquid crystal display device according to the embodiment. FIG. 2 shows an equivalent circuit of elements formed on a thin film transistor (TFT) substrate 1. As shown in FIGS. 1 and 2, a liquid crystal display device has a structure where a TFT substrate (array substrate) 1 on which TFTs 2 are formed and an opposite substrate 4 on which a common electrode is formed are faced and adhered and liquid crystal is sealed therebetween.

As shown in FIG. 2, on the TFT substrate 1, a plurality of gate bus lines 6 extending in a horizontal direction in the drawing is formed in parallel with each other and a plurality of drain bus lines 8 substantially squarely intersecting therewith and extending in an up and down direction in the drawing is formed in parallel with each other. The respective regions surrounded by pluralities of gate bus lines 6 and drain bus lines 8 are pixel regions. Each of the pixel regions is provided with a TFT 2 and a pixel electrode 10. A drain electrode of each of the TFTs 2 is connected to an adjacent drain bus line 8, a gate electrode is connected to an adjacent gate bus line 6 and a source electrode is connected to the pixel electrode 10. At a substantial center of each of the pixel regions, a storage capacitor bus line 12 is formed in parallel with the gate bus line 6. The TFTs 2, pixel electrodes 10, and the respective bus lines 6, 8 and 12 are formed according to the photolithography process. In the photolithography process, a series of semiconductor processes such as [layering→resist coating→exposing→developing→etching→resist peeling] is repeated.

Figure 3:
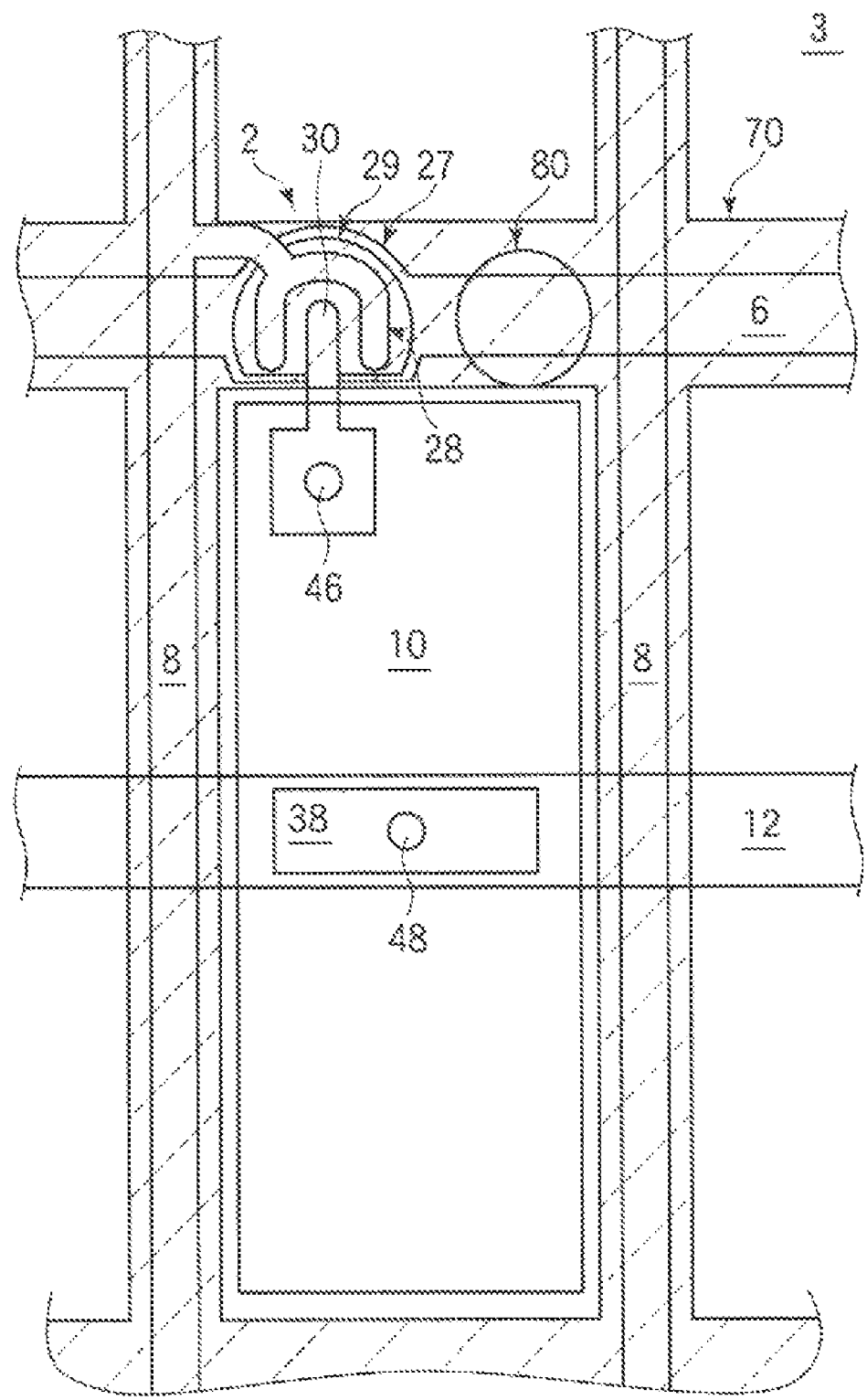
FIG. 3 is a diagram showing a plan layout of one pixel of the TFT substrate 1 used in the liquid crystal display device according to the first embodiment of the invention.

FIG. 3 shows a configuration of one pixel of a plurality of the pixels formed on the TFT substrate 1. As shown in FIG. 3, on a glass substrate 3 as a transparent insulating substrate, a plurality of gate bus lines 6 (in FIG. 3, only one gate bus line is shown) extending in a horizontal direction in the drawing is formed. Furthermore, on the glass substrate 3, a plurality of drain bus lines 8 (in FIG. 3, only two drain bus lines are shown) that intersects through an insulating film (not shown in the drawing) with the gate bus line 6 and extends in an up and down direction in the drawing is formed. In what follows, immediately above the gate bus line 6, the insulating film is called a gate insulating film. Regions demarcated with the gate bus lines 6 and the drain bus lines 8 become pixel regions. The TFT 2 is formed in the vicinity of a center portion between the drain bus lines 8 on the gate bus line 6.

A drain electrode 28 of the TFT 2 is extracted from the drain bus line 8 on an upper side in FIG. 3 and an end portion thereof is formed so as to locate on a channel/island 29 formed on the gate bus line 6. A source electrode 30 is formed on a side of the other end edge on the channel/island 29 so as to face the drain electrode 28. In such a configuration, the gate bus line 6 region immediate below the channel/island 29 functions as a gate electrode 27 of the TFT 2.

Furthermore, at a substantial center of the pixel region, the storage capacitor bus line 12 extending in a horizontal direction in the drawing is formed. On a top layer of the storage capacitor bus line 12 within the pixel region, through an insulating film, a storage capacitor electrode 38 is formed. On an entire surface of a pixel region including a top layer of the TFT 2 and a top layer of the storage capacitor electrode 38 shown in FIG. 3, for each of the pixels, a transparent oxide electrode material is patterned to form a pixel electrode 10. The pixel electrode 10 is electrically connected with the source electrode 30 through a contact hole 46 formed by opening a final protective film (not shown in the drawing). Similarly, the pixel electrode 10 is electrically connected with the storage capacitor electrode 38 through a contact hole 48 formed by opening a final protective film.

Figure 4:
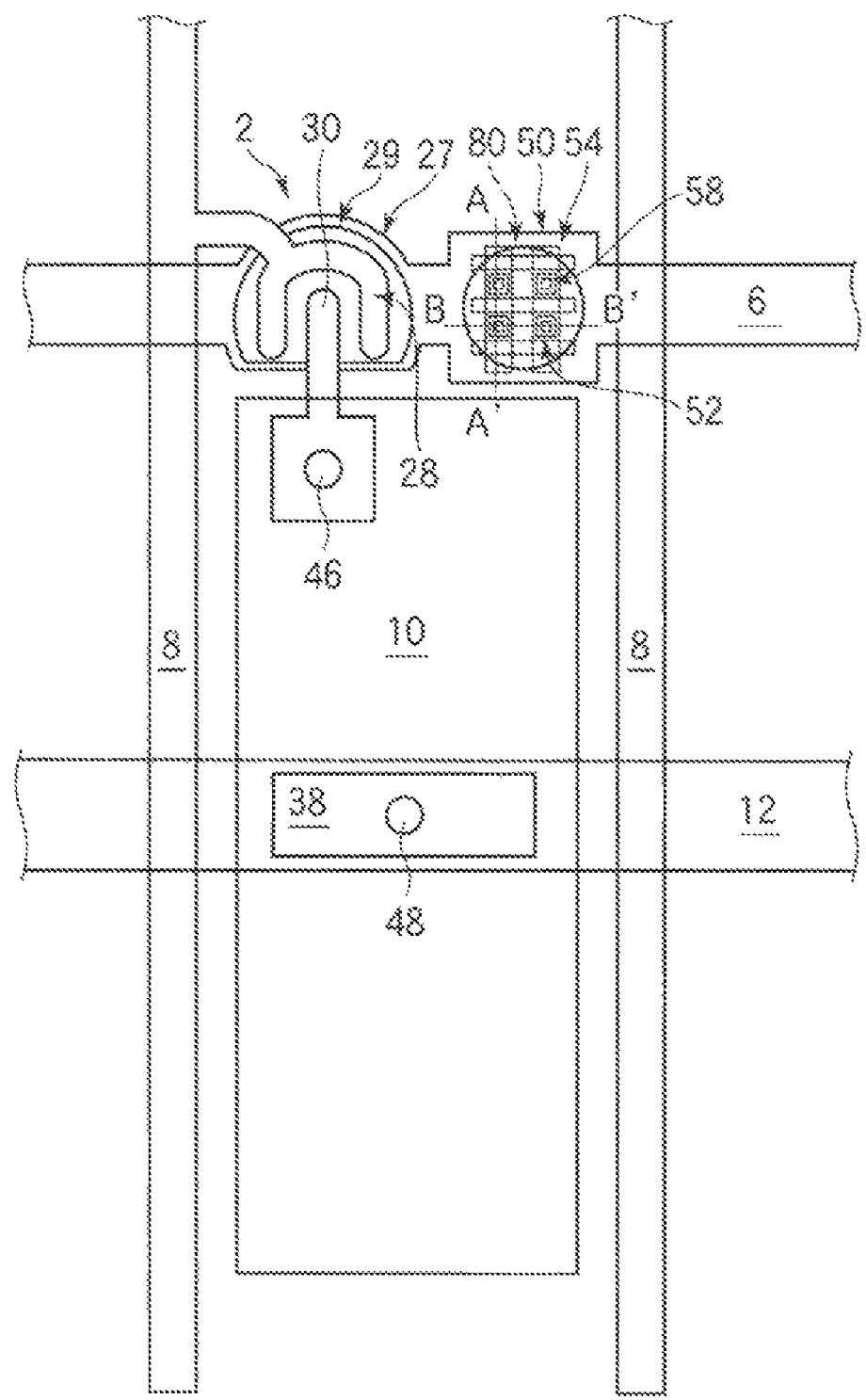
FIG. 4 is a diagram showing a plan layout of one pixel of the TFT substrate 1 used in the liquid crystal display device according to the first embodiment of the invention.
Figure 5:
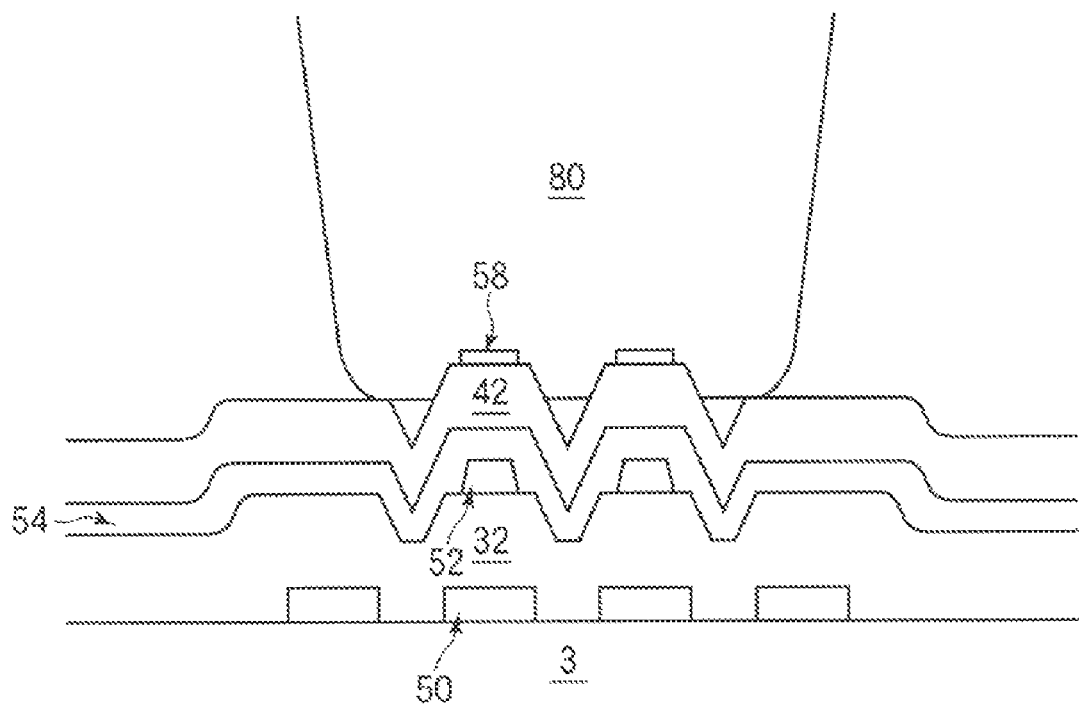
FIG. 5 is a diagram showing the TFT substrate 1 used in the liquid crystal display device according to the first embodiment of the invention with a section cut along a virtual line A-A' shown in FIG. 4.
Figure 6:
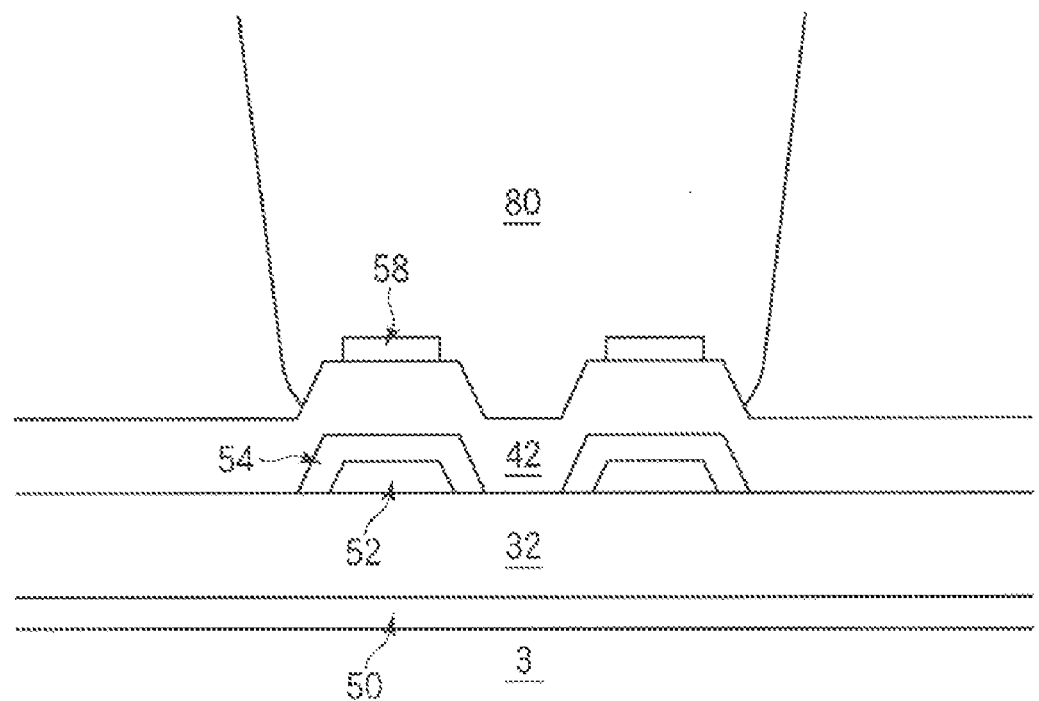
FIG. 6 is a diagram showing the TFT substrate 1 used in the liquid crystal display device according to the first embodiment of the invention with a section cut along a virtual line B-B' shown in FIG. 4.

In the next place, a more detailed configuration of a TFT substrate 1 as a substrate for a liquid crystal display device according to the embodiment and a manufacturing method thereof will be described with reference to FIGS. 4 through 6. FIG. 4 shows a plan layout of one pixel of a TFT substrate (second substrate) 1 seen through an opposite substrate (first substrate) 4 of the liquid crystal display device according to the embodiment. FIG. 5 shows a section cut along a virtual line A-A' shown in FIG. 4. FIG. 6 shows a section cut along a virtual line B-B' shown in FIG. 4.

As shown in FIGS. 4 through 6, on a glass substrate 3 as a transparent insulating substrate, directly or as needs arise after a protective film such as SiOx is formed, for instance, Al (aluminum) or an Al alloy (not shown in the drawing) with a film thickness of for instance 130 nm and Ti (titanium) or a Ti alloy (not shown in the drawing) with a film thickness of for instance 70 nm are layered in this order over an entire surface by means of a sputtering method to form a metal layer having a thickness of substantially 200 nm. As a refractory metal layer, other than Ti, for instance, Cr (chromium), Mo (molybdenum), Ta (tantalum), W (tungsten) or alloys thereof can be used. Furthermore, as the Al alloy, materials where Al contains at least one of Nd (neodymium), Si (silicon), Cu (copper), Ti, W, Ta and Sc (scandium) can be used.

Subsequently, after a resist layer is formed over an entire surface, a first mask (photomask or reticle, hereinafter generically referred to as mask) is used to expose to form a resist mask, followed by applying the dry etching with a chlorine-based gas to pattern the Al alloy, and thereby a gate bus line 6, a storage capacitor bus line 12 and a first columnar spacer receiving pattern (columnar spacer receiver) 50 are formed.

In the next place, for instance a silicon nitride film (SiN) is layered by means of a plasma CVD method over an entire surface of the substrate at a thickness of substantially 400 nm, and thereby, an insulating film 32 that is a gate insulating film immediately above the gate bus line 6 and an interlayer insulating film in a remaining region is formed. In what follows, depending on a site where the insulating film 32 is layered, the insulating film 32 is called a gate insulating film 32 or simply an insulating film 32. As shown in FIG. 5, the insulating film 32 on the first columnar spacer receiving pattern 50 is provided with irregularities. Subsequently, for instance, an amorphous silicon (a-Si) layer (not shown in the drawing) for forming an operating semiconductor layer (not shown in the drawing) is layered, by means of a plasma CVD method, over an entire surface of the substrate at a thickness of substantially 130 nm. Furthermore, in order to form an ohmic contact layer (not shown in the drawing), for instance, an $N^+$ a-Si layer (not shown in the drawing) is layered, by means of the plasma CVD method, over an entire surface of the transparent glass substrate 3 at a thickness of substantially 30 nm.

Then, a photoresist is coated over an entire surface by means of the spin coating method, followed by exposing with a mask from a forward direction, and thereby a resist pattern where only on a formation region of a gate electrode 29 and a columnar spacer receiving first layer (first columnar spacer receiving pattern 50) a resist layer remains is formed. With the resist layer as an etching mask, an ohmic contact layer and an operating semiconductor layer are dry etched with a fluorine-based gas, and thereby a channel/island 29 and a second columnar spacer receiving pattern (columnar spacer receiver) 52 are formed.

In the next place, in order to form a source electrode 30, a drain electrode 28, a storage capacitor electrode 38, a drain bus line 8 and a third columnar spacer receiving pattern 54, for instance, Mo (or Mo alloy)/Al (or Al alloy)/Mo (or Mo alloy) are layered respectively at thicknesses of 20 nm/200 nm/40 nm by means of the sputtering method. As a refractory metal layer, other than Mo, for instance, Cr, Mo, Ta, W or alloys thereof can be used. Then, over an entire surface of the substrate, a photoresist layer is formed, followed by exposing with a third mask, further followed by developing, and thereby the resist layer is patterned. With the patterned resist layer as an etching mask, the Mo (or Mo alloy)/Al (or Al alloy)/Mo (or Mo alloy) are wet-etched with a mixed solution of acetic acid, nitric acid and phosphoric acid, and thereby a drain bus line 8, a drain electrode 28, a source electrode 30, a storage capacitor electrode 38 and a third columnar spacer receiving pattern 54 (columnar spacer receiver) are formed.

Subsequently, the dry etching is applied with a fluorine-based gas to the ohmic contact layer and operating semiconductor layer to etch the ohmic contact layer and half etch the operating semiconductor layer to separate a channel, and thereby a TFT 2 is formed.

In the next place, over an entire surface of the substrate, for instance, a silicon nitride film (SiN) is formed by means of the plasma CVD method at a film thickness of substantially 300 nm. Subsequently, with a fourth mask, a resist is exposed on a top layer of a source electrode 30 pad, a top layer of the storage capacitor electrode 38, a top layer of a terminal and a top layer of terminal reconnecting portion, followed by developing to pattern the resist layer. With this as a mask, the dry etching is applied with a fluorine-based gas to remove a final protective film 42 and the gate insulating film 32, and thereby contact holes 46 and 48 are formed. As shown in FIGS. 5 and 6, in the final protective film 42, irregularities following shapes of the first through the third columnar spacer receiving patterns 50, 52 and 54 are formed.

In the next place, an ITO film (thickness: 70 nm) for forming a pixel electrode 10 and a fourth columnar spacer receiving pattern (columnar spacer receiver) 58, which are made of ITO (indium tin oxide) that is a transparent oxide conductive material is formed by means of a thin film formation method such as the sputtering method over an entire surface of the substrate. Thereafter, a resist mask with a predetermined pattern is formed and the wet etching is applied with an oxalic acid base etchant to form a pixel electrode 10 electrically connected with the source electrode 30 and the storage capacitor electrode 48 through the contact holes 46 and 48 and a fourth columnar spacer receiving pattern 58 on the irregular portion of the final protective film 42. Thus, in the TFT formation process, a projected structure made of the first through the fourth columnar spacer receiving patterns 50, 52, 54 and 58, the insulating film 32 and the final protective film 42 is formed.

After that, the heat treatment is applied at a temperature in the range of 150 to 230° C. and preferably at 200° C. Thereafter, in the forming a liquid crystal display panel, the TFT substrate 1 and the opposite substrate 4 are adhered so that the columnar spacer 80 and the projected structure made of the first through the fourth columnar spacer receiving patterns 50, 52, 54 and 58 and so on may come into contact.

The projected structure formed of the first through the fourth columnar spacer receiving patterns 50, 52, 54 and 58 and so on arranged on the TFT substrate 1 is buried in and brought into contact with the columnar spacer 80 disposed on the opposite substrate 4. Thereby, even when the liquid crystal display panel is surface pressed, both substrates 1 and 4 are hardly displaced; accordingly, the light leakage can be reduced very low. Thereby, since problems such as the image lag and deterioration of the contrast owing to the light leakage can be overcome, a high quality liquid crystal display device can be obtained.

Second Embodiment

Figure 7:
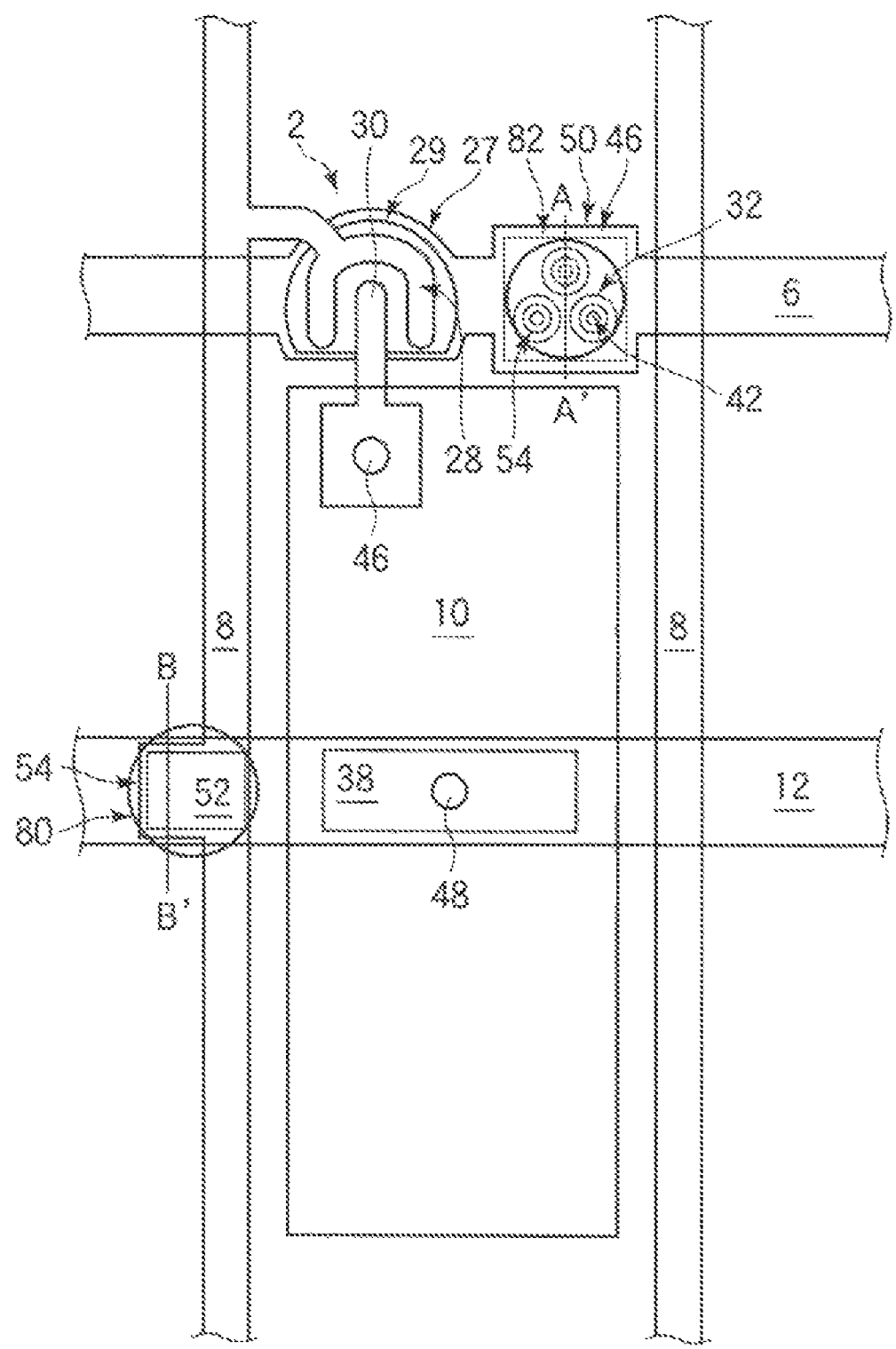
FIG. 7 is a diagram showing a plan layout of one pixel of a TFT substrate 1 used in a liquid crystal display device according to a second embodiment of the invention.
Figure 8:
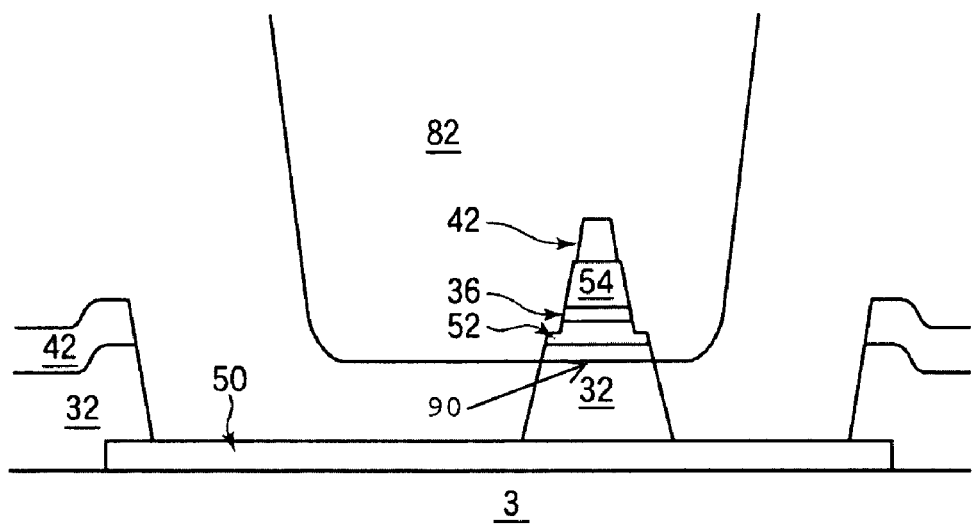
FIG. 8 is a diagram showing the TFT substrate 1 used in the liquid crystal display device according to the second embodiment of the invention with a section cut along a virtual line A-A' shown in FIG. 7.
Figure 9:
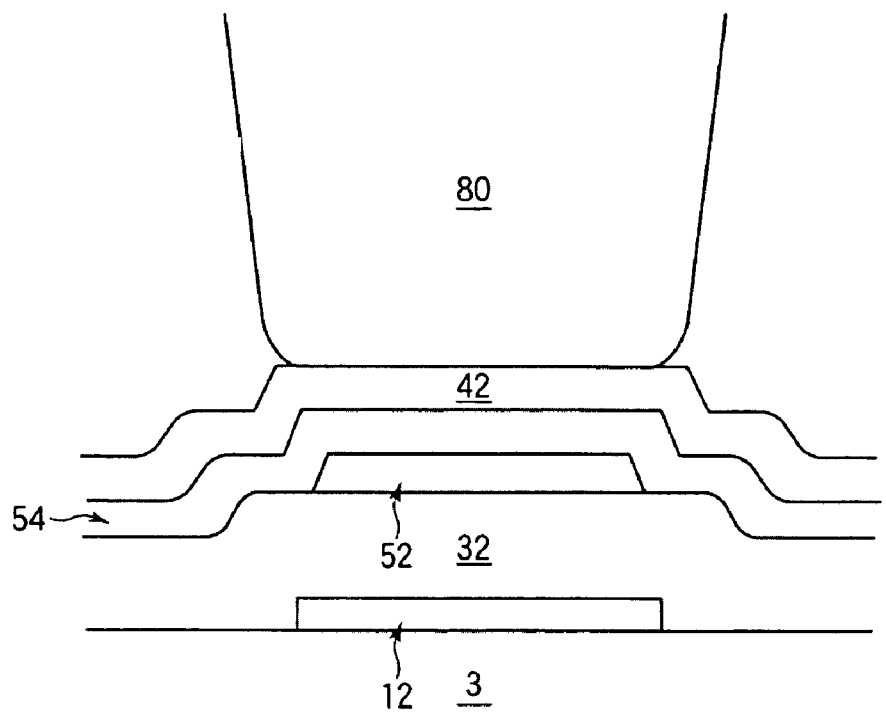
FIG. 9 is a diagram showing the TFT substrate 1 used in the liquid crystal display device according to the second embodiment of the invention with a section cut along a virtual line B-B' shown in FIG. 7.

A liquid crystal display device according to a second embodiment of the invention and a manufacturing method thereof will be described with reference to FIGS. 7 through 9. A schematic configuration of a liquid crystal display device according to the embodiment is similar to that of the liquid crystal display device according to the first embodiment; accordingly, a description thereof will be omitted. FIG. 7 shows a plan layout of one pixel of a TFT substrate (second substrate) 1, which is seen through an opposite substrate (first substrate) 4 of the liquid crystal display device of the embodiment. FIG. 8 shows a section cut along a virtual line A-A' shown in FIG. 7. FIG. 9 shows a section cut along a virtual line B-B' shown in FIG. 7.

As shown in FIGS. 7 through 9, on a glass substrate 3 as a transparent insulating substrate, directly or as needs arise after a protective film such as SiOx is formed, for instance, Al (aluminum) or an Al alloy (not shown in the drawing) with a film thickness of for instance 130 nm and Ti (titanium) or a Ti alloy (not shown in the drawing) with a film thickness of for instance 70 nm are layered in this order over an entire surface by means of the sputtering method to form a metal layer having a thickness of substantially 200 nm. As the refractory metal layer, other than Ti, for instance, Cr, Mo, Ta, W and alloys thereof can be used. Furthermore, as the Al alloy, materials where Al contains at least one of Nd, Si, Cu, Ti, W, Ta and Sc can be used. Subsequently, after a resist layer is formed over an entire surface, a first mask (photomask or reticle, hereinafter generically referred to as mask) is used to expose to form a resist mask, followed by applying the dry etching with a chlorine-based gas to form a gate bus line 6, a storage capacitor bus line 12 and a first columnar spacer receiving pattern 50.

In the next place, for instance a silicon nitride film (SiN) is layered by means of the plasma CVD method over an entire surface of the substrate at a thickness of substantially 400 nm, and thereby, an insulating film 32 that is a gate insulating film immediately above the gate bus line 6 and an interlayer insulating film in a remaining region is formed. In what follows, depending on a site where the insulating film 32 is layered, the insulating film 32 is called a gate insulating film 32 or simply an insulating film 32. Subsequently, for instance, an amorphous silicon (a-Si) layer (not shown in the drawing) for forming an operating semiconductor layer (not shown in the drawing) is layered, by means of the plasma CVD method, over an entire surface of the substrate at a thickness of substantially 130 nm. Furthermore, in order to form an ohmic contact layer 36, for instance, an N+ a-Si layer (not shown in the drawing) is layered, by means of the plasma CVD method, over an entire surface of the transparent glass substrate 3 at a thickness of substantially 30 nm.

Then, a photoresist is coated over an entire surface by means of the spin coat method, followed by exposing with a mask from a forward direction, and thereby a resist pattern where only on regions of a gate electrode 29 and a first columnar spacer receiving pattern 50 a resist layer remains is formed. With the resist pattern as an etching mask, an ohmic contact layer 36 and an operating semiconductor layer are dry etched with a fluorine-based gas, and thereby a channel/island 29 and a second columnar spacer receiving pattern 52 are formed.

In the next place, in order to form a source electrode 30, a drain electrode 28, a storage capacitor electrode 38, a drain bus line 8 and a third columnar spacer receiving pattern 54, for instance, Mo (or Mo alloy)/Al (or Al alloy)/Mo (or Mo alloy) are layered respectively with thicknesses of 20 nm/200 nm/40 nm by means of the sputtering method. As a refractory metal layer, other than Mo, for instance, Cr, Mo, Ta, W and alloys thereof can be used.

Then, over an entire surface of the substrate, a photoresist layer is formed, followed by exposing the resist with a third mask, further followed by developing to pattern the resist layer. With the patterned resist layer as an etching mask, the Mo (or Mo alloy)/Al (or Al alloy)/Mo (or Mo alloy) are wet etched with a mixed solution of acetic acid, nitric acid and phosphoric acid, and thereby a drain bus line 8, a drain electrode 28, a source electrode 30, a storage capacitor electrode 38 and a third columnar spacer receiving pattern 54 are formed.

Subsequently, the dry etching is applied with a fluorine-based gas to the ohmic contact layer 36 and operating semiconductor layer to etch the ohmic contact layer 36 and half etch the operating semiconductor layer 34 to separate a channel, and thereby a TFT 2 is formed.

In the next place, over an entire surface of the substrate, for instance, a silicon nitride film (SiN) is formed by means of the plasma CVD method at a film thickness of substantially 300 nm. Subsequently, with a fourth mask, a resist is exposed on a top layer of a source electrode 30 pad, a top layer of the storage capacitor electrode 38, a top layer of a terminal, a top layer of terminal reconnecting portion and a first columnar spacer receiving pattern 50, followed by developing to pattern the resist layer. With this as a mask, the dry etching is applied with a fluorine-based gas to remove a final protective film 42 and the gate insulating film 32, and thereby contact holes 46 and 48 are formed. As shown in FIGS. 8 and 9, the final protective film 42 on the third columnar spacer receiving pattern 54 remains without being removed.

As shown in FIG. 8, a projected structure made of the first through the third columnar spacer receiving patterns 50, 52 and 54, the insulating film 32, the ohmic contact layer 36 and the final protective film 42 is formed. The projected structure is an isolated pattern and is formed into a structure where an area of the insulating film 32 that is a lower layer portion is larger than that of the final protective layer 42 that is a top layer portion. Furthermore, three projected structures are formed symmetrically to each other on the first columnar spacer receiving pattern 50. A columnar spacer periphery portion disposed in the periphery of the columnar spacer 82 is formed so as to surround the three projected structures. An inner wall of the columnar spacer periphery portion is formed of the insulating film 32 and the final protective film 42. The columnar spacer periphery portion is formed so as to be higher than a columnar spacer contact portion 90 where the projected structure comes into contact with a tip end of the columnar spacer 82.

Furthermore, on the storage capacitor bus line 12 as well, a projected structure made of the second and the third columnar spacer receiving patterns 52 and 54, the storage capacitor bus line 12, the insulating film 32 and the final protective film 42 is formed. The projected structure is formed into a shape different from the projected structure formed on the first columnar spacer receiving pattern 50. The projected structures and the columnar spacer periphery portion are formed in the TFT forming process.

Subsequently, an ITO film (thickness: 70 nm) for forming a pattern of a pixel electrode 10 that is made of ITO that is a transparent oxide conductive material is formed by means of a thin film formation method such as the sputtering method over an entire surface of the substrate. Thereafter, a resist mask with a predetermined pattern is formed and the wet etching is applied with an oxalic acid base etchant to form a pixel electrode 10 electrically connected through the contact holes 46 and 48 with the source electrode 30 and the storage capacitor electrode 38. Thereafter, the heat treatment is applied in the range of 150 to 230° C. and preferably at 200° C. Thereafter, in the liquid crystal display panel formation process, a TFT substrate 1 and an opposite substrate 4 are adhered so that the columnar spacers 80 and 82 and a projected structure made of the first through the third columnar spacer receiving patterns 50, 52 and 54 and the like may come into contact. The columnar spacer 80 is brought into contact with a projected structure made of the second and the third columnar spacer receiving patterns 52 and 54 and the like on a side of the TFT substrate 1. On the other hand, the columnar spacer 82 is partially brought into contact with the projected structure made of the first through the third columnar spacer receiving patterns 50, 52 and 54 and the like buried and a remaining portion is not in contact with the first columnar spacer receiving pattern 50.

A projected structure on the first columnar spacer receiving pattern 50 is buried in a part of the columnar spacer 82 and brought into contact therewith and a projected structure on the storage capacitor bus line 12 is brought into contact with the columnar spacer 80. Thereby, even when the liquid crystal display panel is surface pressed, the TFT substrate 1 and the opposite substrate 4 are hardly displaced; accordingly, the light leakage can be reduced very low. Thereby, since problems such as the image lag and deterioration of the contrast owing to the light leakage can be overcome, a high quality liquid crystal display device can be obtained.

Third Embodiment

Figure 10:
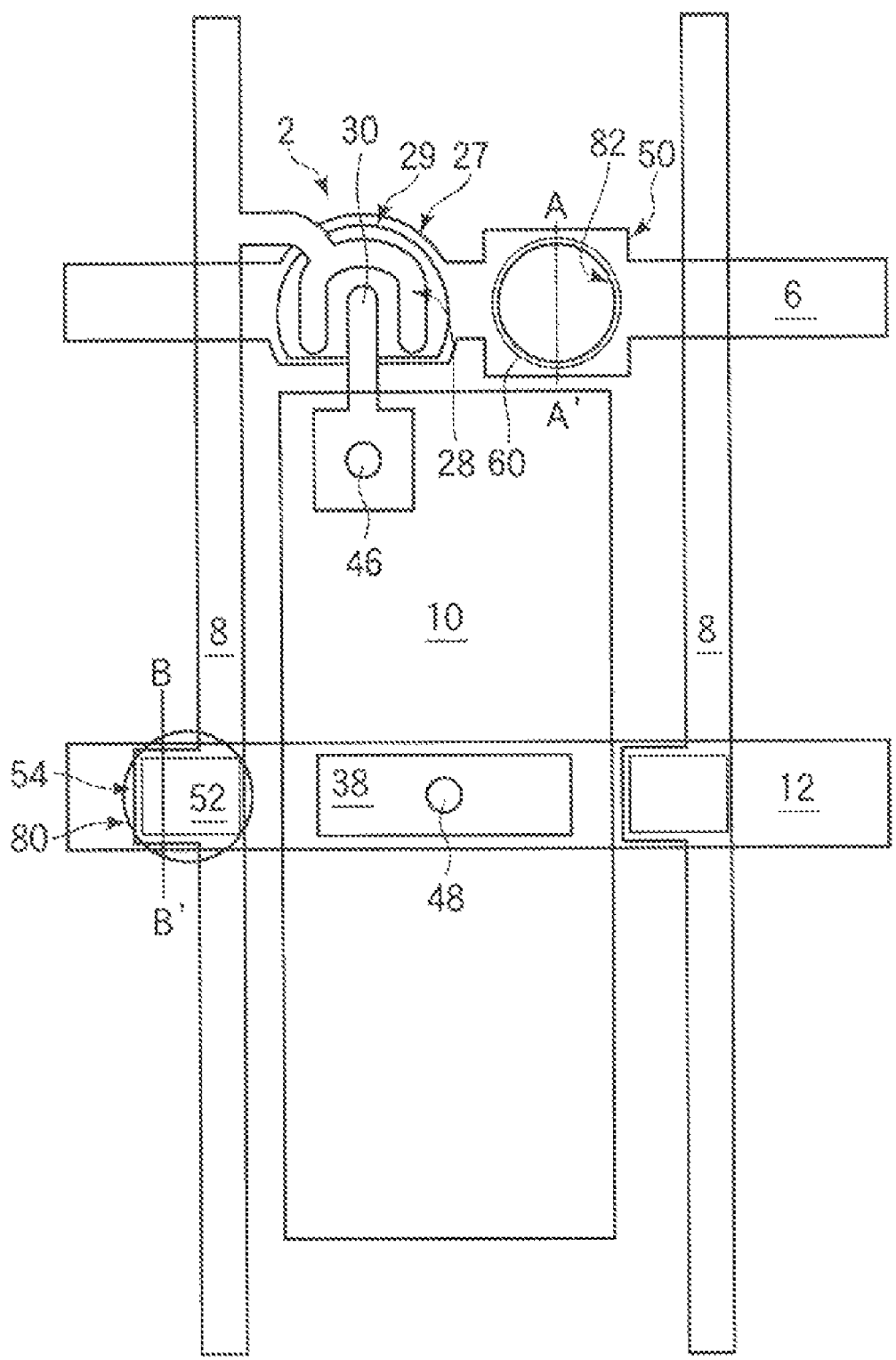
FIG. 10 is a diagram showing a plan layout of one pixel of a TFT substrate 1 used in a liquid crystal display device according to a third embodiment of the invention.
Figure 11:
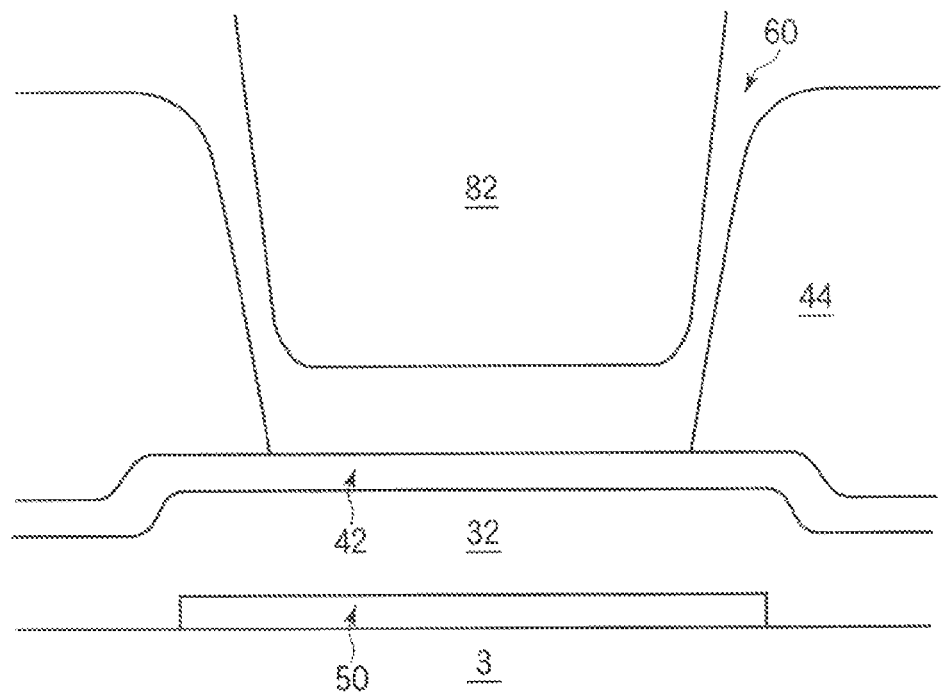
FIG. 11 is a diagram showing the TFT substrate 1 used in the liquid crystal display device according to the third embodiment of the invention with a section cut along a virtual line A-A' shown in FIG. 10.
Figure 12:
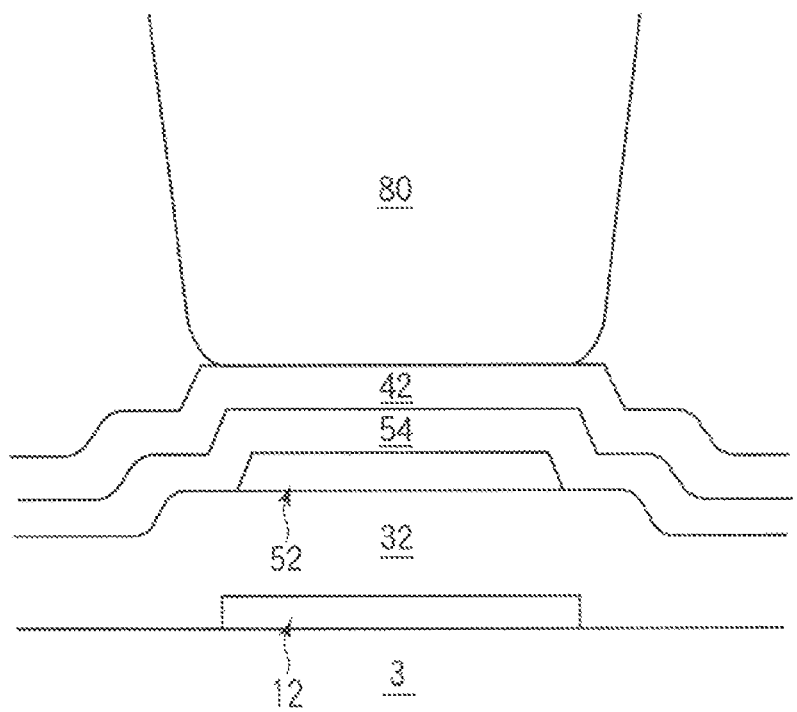
FIG. 12 is a diagram showing the TFT substrate 1 used in the liquid crystal display device according to the third embodiment of the invention with a section cut along a virtual line B-B' shown in FIG. 10.

A liquid crystal display device according to a third embodiment of the invention and a manufacturing method thereof will be described with reference to FIGS. 10 through 12. A schematic configuration of a liquid crystal display device according to the embodiment is similar to that of the liquid crystal display device according to the first embodiment; accordingly, a description thereof will be omitted. FIG. 10 shows a plan layout of one pixel of a TFT substrate (second substrate) 1, which is seen through an opposite substrate (first substrate) 4 of the liquid crystal display device of the embodiment. FIG. 11 shows a section cut along a virtual line A-A' shown in FIG. 10. FIG. 12 shows a section cut along a virtual line B-B' shown in FIG. 10.

As shown in FIGS. 10 through 12, on a glass substrate 3 as a transparent insulating substrate, directly or as needs arise after a protective film such as SiOx is formed, for instance, Al or an Al alloy (not shown in the drawing) with a film thickness of for instance 130 nm and Ti or a Ti alloy (not shown in the drawing) with a film thickness of for instance 70 nm are layered in this order over an entire surface by means of a sputtering method to form a metal layer having a thickness of substantially 200 nm. As the refractory metal layer, other than Ti, for instance, Cr, Mo, Ta, W and alloys thereof can be used. Furthermore, as the Al alloy, materials where Al contains at least one of Nd, Si, Cu, Ti, W, Ta and Sc can be used.

Subsequently, after a resist layer is formed over an entire surface, a first mask (photomask or reticle, hereinafter generically referred to as mask) is used to expose to form a resist mask, followed by applying the dry etching with a chlorine-based gas to form a gate bus line 6, a storage capacitor bus line 12 and a first columnar spacer receiving pattern 50.

In the next place, for instance a silicon nitride film (SiN) is layered by means of the plasma CVD method over an entire surface of the substrate at a thickness of substantially 400 nm, and thereby, an insulating film 32 that is a gate insulating film immediately above the gate bus line 6 and an interlayer insulating film in a remaining region is formed. In what follows, depending on a site where the insulating film 32 is layered, the insulating film 32 is called a gate insulating film 32 or simply an insulating film 32. As shown in FIGS. 11 and 12, the insulating films 32 on the first columnar spacer receiving pattern 50 and the storage capacitor bus line 12 are provided with a convex portion. Subsequently, for instance, an amorphous silicon (a-Si) layer (not shown in the drawing) for forming an operating semiconductor layer (not shown in the drawing) is layered, by means of the plasma CVD method, over an entire surface of the substrate at a thickness of substantially 130 nm. Furthermore, in order to form an ohmic contact layer (not shown in the drawing), for instance, an $N^+$ a-Si layer (not shown in the drawing) is layered, by means of the plasma CVD method, over an entire surface of the transparent glass substrate 3 at a thickness of substantially 30 nm.

Then, a photoresist is coated over an entire surface by means of the spin coating method, followed by exposing with a mask from a forward direction, and thereby a resist pattern where a resist layer remains only on a gate electrode 29 and a storage capacitor bus line 12 (on a columnar spacer receiving pattern formation region) in the vicinity of an intersecting position of a storage capacitor bus line 12 and a drain bus line 8 is formed. With the resist pattern as an etching mask, an ohmic contact layer and an operating semiconductor layer are dry etched with a fluorine-based gas, and thereby a channel/island 29 and a second columnar spacer receiving pattern 52 are formed. The second columnar spacer receiving pattern 52 is formed only on the storage capacitor bus line 12 and is not formed on the first columnar spacer receiving pattern 50.

In the next place, in order to form a source electrode 30, a drain electrode 28, a storage capacitor electrode 38, a drain bus line 8 and a third columnar spacer receiving pattern 54, for instance, Mo (or Mo alloy)/Al (or Al alloy)/Mo (or Mo alloy) are layered respectively with thicknesses of 20 nm/200 nm/40 nm by means of the sputtering method. As a refractory metal layer, other than Mo, for instance, Cr, Mo, Ta, W or alloys thereof can be used.

Then, over an entire surface of the substrate, a photoresist layer is formed, followed by exposing a resist with a third mask, further followed by developing, and thereby the resist layer is patterned. With the patterned resist layer as an etching mask, the Mo (or Mo alloy)/Al (or Al alloy)/Mo (or Mo alloy) are wet etched with a mixed solution of acetic acid, nitric acid and phosphoric acid, and thereby a drain bus line 8, a drain electrode 28, a source electrode 30, a storage capacitor electrode 38 and a third columnar spacer receiving pattern 54 are formed. The third columnar spacer receiving pattern 54 is formed only on the storage capacitor bus line 12 and is not formed on the first columnar spacer receiving pattern 50.

Subsequently, the dry etching is applied with a fluorine-based gas to the ohmic contact layer and operating semiconductor layer to etch the ohmic contact layer and half etch the operating semiconductor layer to separate a channel, and thereby a TFT 2 is formed.

In the next place, over an entire surface of the substrate, for instance, a silicon nitride film (SiN) is formed by means of the plasma CVD method at a film thickness of substantially 300 nm. Subsequently, with a fourth mask, a resist is exposed on a top layer of a source electrode 30 pad, a top layer of the storage capacitor electrode 38, a top layer of a terminal, a top layer of terminal reconnecting portion and a first columnar spacer receiving pattern 50, followed by developing to pattern the resist layer. With this as a mask, the dry etching is applied with a fluorine-based gas to remove a final protective film 42 and the gate insulating film 32, and thereby contact holes 46 and 48 are formed.

Subsequently, over an entire surface of the substrate, an overcoat layer 44 is formed by means of the spin coat method, followed by exposing with a fifth mask on the contact holes 46 and 48 and the first columnar spacer receiving pattern 50, further followed by developing to form an opening on the contact holes 46 and 48 and a columnar spacer receiving hole (columnar spacer periphery portion) 60 on the first columnar spacer receiving pattern 50. Thus, the columnar spacer receiving hole 60 formed in the TFT formation process has a throughhole structure and an inner wall thereof is formed of the overcoat layer 44. Furthermore, as shown in FIG. 11, in the final protective film 42 on the first columnar spacer receiving pattern 50, a convex portion following the first columnar spacer receiving pattern 50 is formed. Thus, in the TFT formation process, a projected structure made of the first columnar spacer receiving pattern 50, the insulating film 32 and the final protective film 42 is formed.

As shown in FIGS. 10 and 12, in the vicinity of a region where the storage capacitor bus line 12 and the drain bus line 8 intersect, in the final protective film 42 on the storage capacitor bus line 12, a projected structure following the second and the third columnar spacer receiving patterns 52 and 54 is formed. The projected structure is formed in the TFT formation process and made of the storage capacitor bus line 12, the second and the third columnar spacer receiving patterns 52 and 54, the insulating film 32 and the final protective film 42.

Subsequently, an ITO film (thickness: 70 nm) for forming a pattern of a pixel electrode 10 that is made of ITO that is a transparent oxide conductive material is formed by means of a thin film formation method such as the sputtering method over an entire surface of the substrate. Thereafter, a resist mask with a predetermined pattern is formed and the wet etching is applied with an oxalic acid base etchant to form a pixel electrode 10 electrically connected through the contact holes 46 and 48 with the source electrode 30 and the storage capacitor electrode 48. Thereafter, the heat treatment is applied in the range of 150 to 230° C. and preferably at 200° C.

Thereafter, in the liquid crystal display panel formation process, a TFT substrate 1 and an opposite substrate 4 are adhered so that the columnar spacer 82 may be inserted in the columnar spacer receiving hole 60 and the columnar spacer 80 may come into contact with a projected structure made of the second and the third columnar spacer receiving patterns 52 and 54. The columnar spacer 80 is brought into contact with a projected structure. The columnar spacer 82 is inserted into the columnar spacer receiving hole 60 so that the columnar spacer receiving hole 60 may be higher than a tip end of the columnar spacer 82. However, since the projected structure on the first columnar spacer receiving pattern 50 is different in shape from the projected structure on the storage capacitor bus line 12 and formed lower than that, the final protective film 42 on the first columnar spacer receiving pattern 50 does not come into contact with the columnar spacer 82. Accordingly, in the region, a contact in a height direction (Z direction) is not caused.

When the columnar spacer 82 disposed on the opposite substrate 4 is inserted in the columnar spacer receiving hole 60 formed on the TFT substrate 1 and the columnar spacer 80 is brought into contact with the projected structure made of the second and the third columnar spacer receiving patterns 52 and 54, even when the liquid crystal display panel is surface pressed, both substrates 1 and 4 are hardly displaced; accordingly, the light leakage can be reduced very low. Thereby, since problems such as the image lag and deterioration of the contrast owing to the light leakage can be overcome, a high quality liquid crystal display device can be obtained.

Fourth Embodiment

Figure 13:
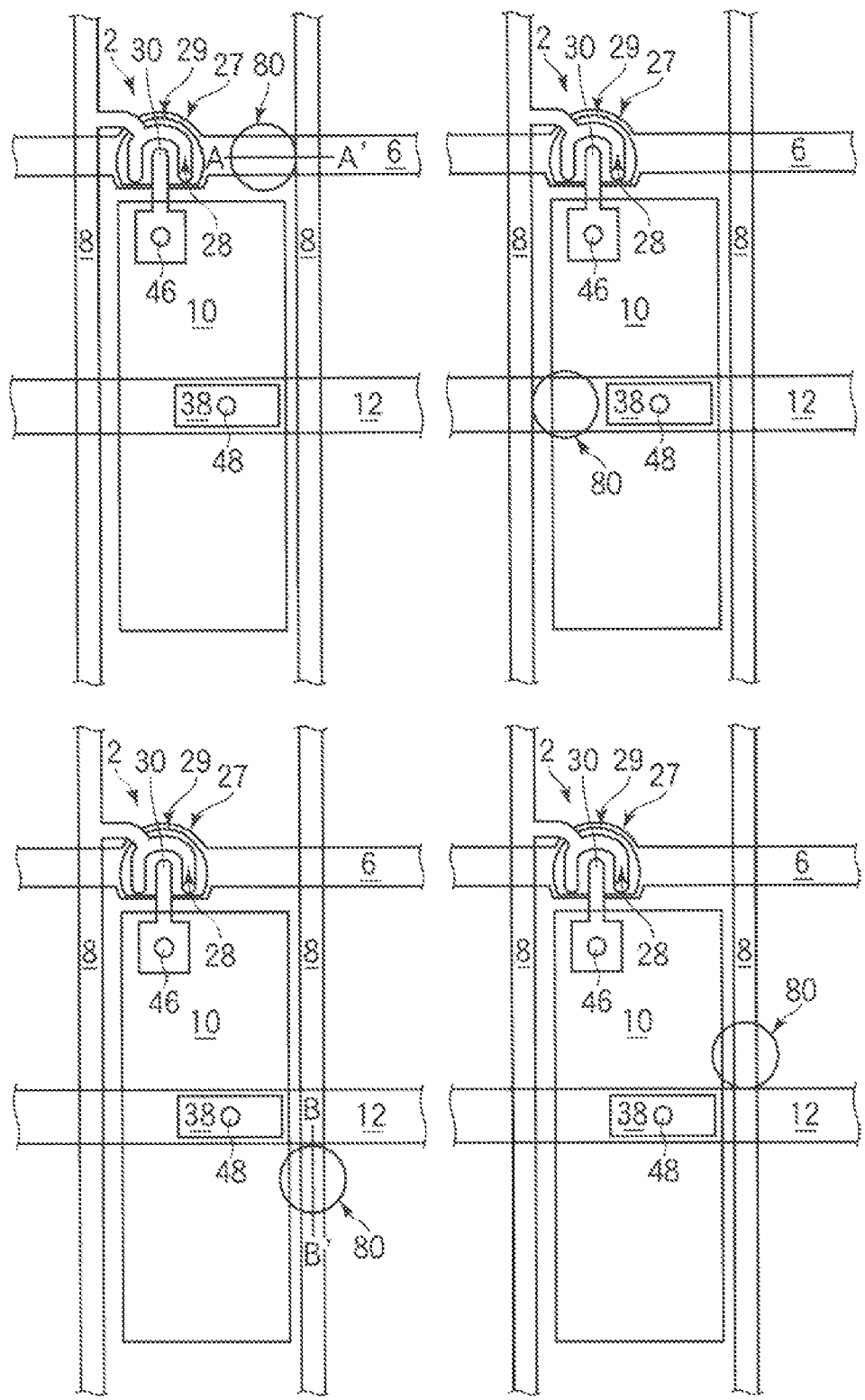
FIG. 13 is a diagram partially showing a plane of a TFT substrate 1 used in a liquid crystal display device according to a fourth embodiment of the invention.
Figure 14:
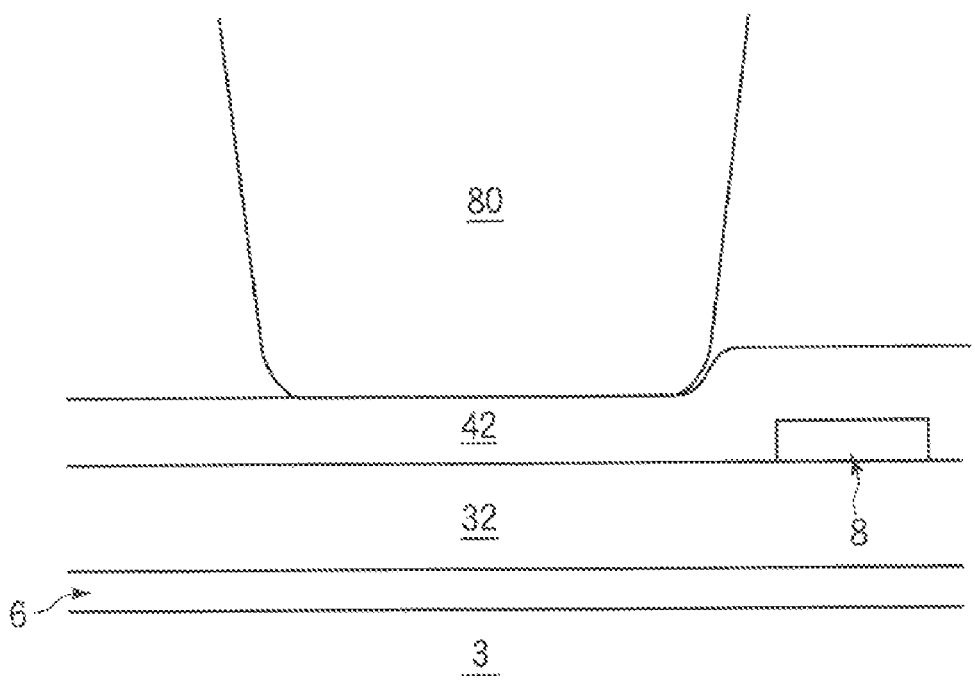
FIG. 14 is a diagram showing the TFT substrate 1 used in the liquid crystal display device according to the fourth embodiment of the invention with a section cut along a virtual line A-A' shown in FIG. 13.
Figure 15:
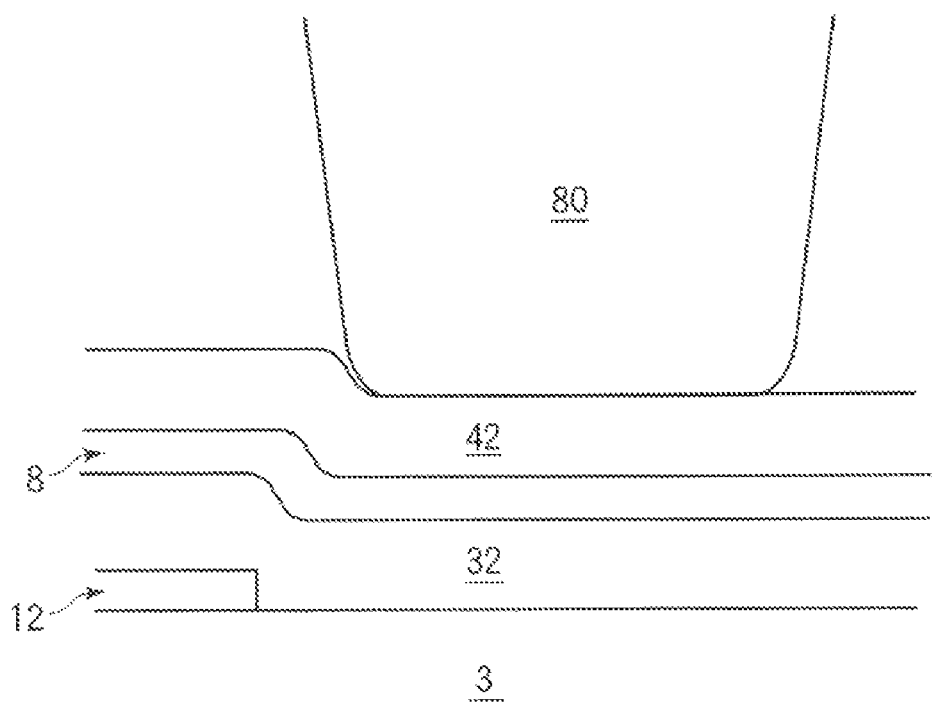
FIG. 15 is a diagram showing the TFT substrate 1 used in the liquid crystal display device according to the fourth embodiment of the invention with a section cut along a virtual line B-B' shown in FIG. 13.

A liquid crystal display device according to a fourth embodiment of the invention and a manufacturing method thereof will be described with reference to FIGS. 13 through 15. A schematic configuration of a liquid crystal display device according to the embodiment is similar to that of the liquid crystal display device according to the first embodiment; accordingly, a description thereof will be omitted. FIG. 13 partially shows a plane of a TFT substrate (second substrate) 1, which is seen through an opposite substrate (first substrate) 4 of the liquid crystal display device of the embodiment. FIG. 14 shows a section cut along a virtual line A-A' shown in FIG. 13. FIG. 15 shows a section cut along a virtual line B-B' shown in FIG. 13.

As shown in FIGS. 13 through 15, on a glass substrate 3 as a transparent insulating substrate, directly or as needs arise after a protective film such as SiOx is formed, for instance, Al or an Al alloy (not shown in the drawing) with a film thickness of for instance 130 nm and Ti or a Ti alloy (not shown in the drawing) with a film thickness of for instance 70 nm are layered in this order over an entire surface by means of the sputtering method to form a metal layer having a thickness of substantially 200 nm. As the refractory metal layer, other than Ti, for instance, Cr, Mo, Ta, W and alloys thereof can be used. Furthermore, as the Al alloy, materials where Al contains at least one of Nd, Si, Cu, Ti, W, Ta and Sc can be used.

Subsequently, after a resist layer is formed over an entire surface, a first mask (photomask or reticle, hereinafter generically referred to as mask) is used to expose to form a resist mask, followed by applying the dry etching with a chlorine-based gas to form a gate bus line 6 and a storage capacitor bus line 12. In the next place, for instance a silicon nitride film (SiN) is layered by means of the plasma CVD method over an entire surface of the substrate at a thickness of substantially 400 nm, and thereby, an insulating film 32 that is a gate insulating film immediately above the gate bus line 6 and an interlayer insulating film in a remaining region is formed. In what follows, depending on a site where the insulating film 32 is layered, the insulating film 32 is called a gate insulating film 32 or simply an insulating film 32. Subsequently, for instance, an amorphous silicon (a-Si) layer (not shown in the drawing) for forming an operating semiconductor layer (not shown in the drawing) is layered, by means of the plasma CVD method, over an entire surface of the substrate at a thickness of substantially 130 nm. Furthermore, in order to form an ohmic contact layer (not shown in the drawing), for instance, an N$^+$ a-Si layer (not shown in the drawing) is layered, by means of the plasma CVD method, over an entire surface of the transparent glass substrate 3 at a thickness of substantially 30 nm.

Then, a photoresist is coated over an entire surface by means of the spin coat method and the like, followed by exposing with a mask from a forward direction, and thereby a resist pattern where only on a formation region of a gate electrode 29 and a columnar spacer receiving first layer a resist layer remains is formed. With the resist pattern as an etching mask, an ohmic contact layer and an operating semiconductor layer are dry etched with a fluorine-based gas, and thereby a channel/island 29 is formed.

In the next place, in order to form a source electrode 30, a drain electrode 28, a storage capacitor electrode 38 and a drain bus line 8, for instance, Mo (or Mo alloy)/Al (or Al alloy)/Mo (or Mo alloy) are layered respectively with thicknesses of 20 nm/200 nm/40 nm by means of the sputtering method. As a refractory metal layer, other than Mo, for instance, Cr, Mo, Ta, W and alloys thereof can be used. Then, over an entire surface of the substrate, a photoresist layer is formed, followed by exposing a resist with a third mask, further followed by developing, and thereby the resist layer is patterned. With the patterned resist layer as an etching mask, the Mo (or Mo alloy)/Al (or Al alloy)/Mo (or Mo alloy) are wet-etched with a mixed solution of acetic acid, nitric acid and phosphoric acid, and thereby a drain bus line 8, a drain electrode 28, a source electrode 30 and a storage capacitor electrode 38 are formed.

Subsequently, the dry etching is applied with a fluorine-based gas to the ohmic contact layer and operating semiconductor layer to etch the ohmic contact layer and half etch the operating semiconductor layer to separate a channel, and thereby a TFT 2 is formed.

In the next place, over an entire surface of the substrate, for instance, a silicon nitride film (SiN) is formed by means of the plasma CVD method at a film thickness of substantially 300 nm. Subsequently, with a fourth mask, a resist is exposed on a top layer of a source electrode 30 pad, a top layer of the storage capacitor electrode 38, a top layer of a terminal and a top layer of terminal reconnecting portion, followed by developing to pattern the resist layer. With this as a mask, the dry etching is applied with a fluorine-based gas to remove a final protective film 42 and the gate insulating film 32, and thereby contact holes 46 and 48 are formed. As shown in FIGS. 14 and 15, on the drain bus line 8 and on the storage capacitor bus line 12, convex portions following shapes of both bus lines 8 and 12 are formed. A step portion of the final protective film 42 generated by the convex portion formed in the TFT formation process becomes a columnar spacer periphery portion.

Subsequently, over an entire surface of the substrate, an ITO film (thickness: 70 nm) for forming a pixel electrode 10 and a columnar spacer receiving pattern, which are made of ITO that is a transparent oxide conductive material, is formed by means of a thin film formation method such as the sputtering method, followed by forming a resist mask having a predetermined pattern, further followed by applying the wet etching with an oxalic acid base etchant, and thereby a pixel electrode 10 electrically connected through the contact holes 46 and 48 with the source electrode 30 and the storage capacitor electrode 48 is formed. Thereafter, the heat treatment is applied in the range of 150 to 230° C. and preferably at 200° C.

Thereafter, in the liquid crystal display panel formation process, a TFT substrate 1 and an opposite substrate 4 are adhered. As shown in FIGS. 13 through 15, at this time, the columnar spacer 80 is brought into contact with the TFT substrate 1 so as to go along the gate bus line 6 or the drain bus line 8. In FIG. 13, the columnar spacers 80 are disposed at the same frequency in both of right and left directions of the drain bus line 8 and at the same frequency above and below the gate bus line 6 or the storage capacitor bus line 12.

The columnar spacers 80 come into contact with a side face of a step portion of the final protective film 42 generated by the drain bus line 8 or the storage capacitor bus line 12 and are disposed at the same frequency in an up and down direction and a right and left direction. Thereby, even when the liquid crystal display panel is surface pressed, both substrates 1 and 4 are hardly displaced; accordingly, the light leakage can be reduced very low. Thereby, since problems such as the image lag and deterioration of the contrast owing to the light leakage can be overcome, a high quality liquid crystal display device can be obtained.

Fifth Embodiment

Figure 16:
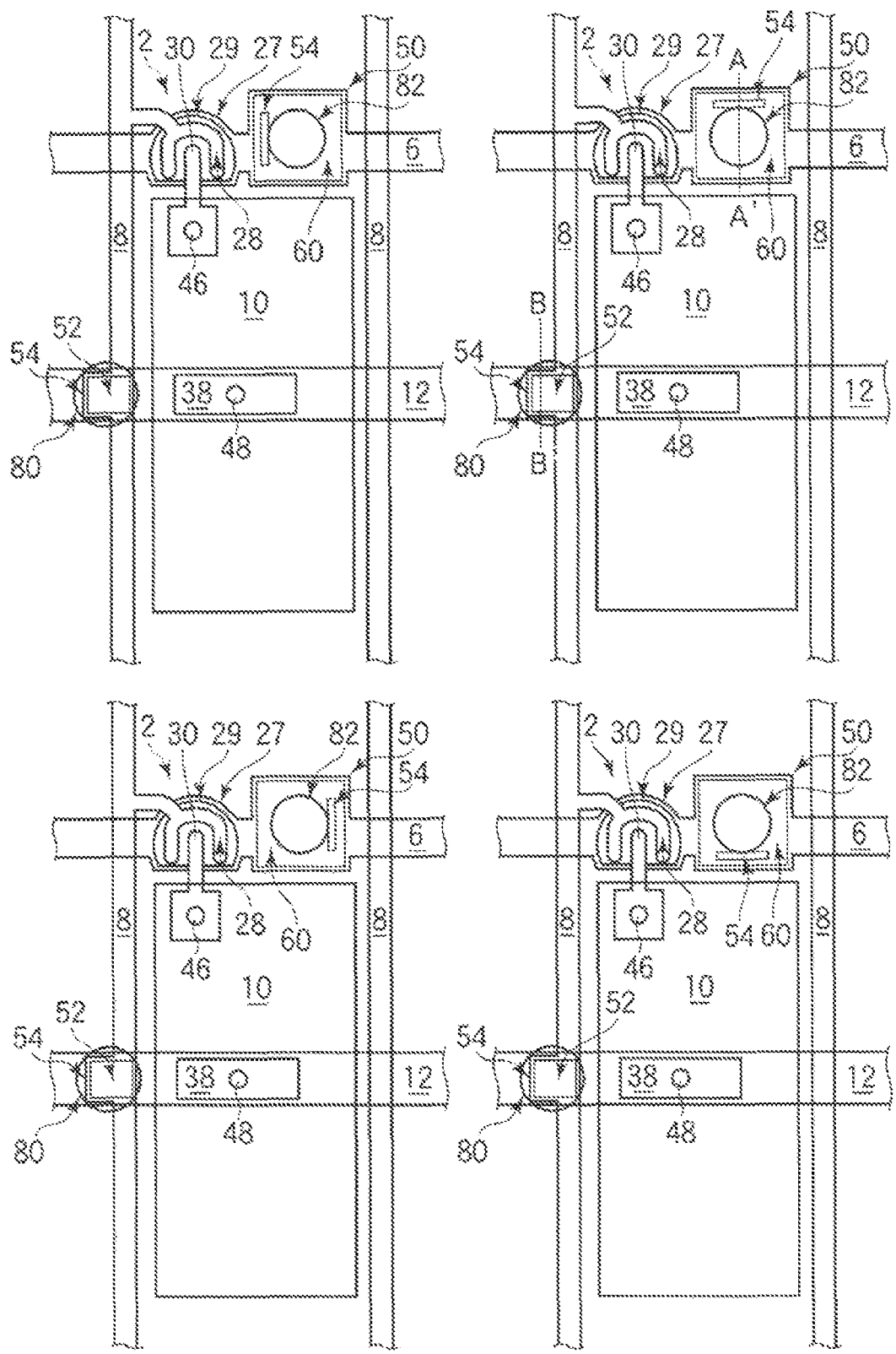
FIG. 16 is a diagram partially showing a plane of a TFT substrate 1 used in a liquid crystal display device according to a fifth embodiment of the invention.
Figure 17:
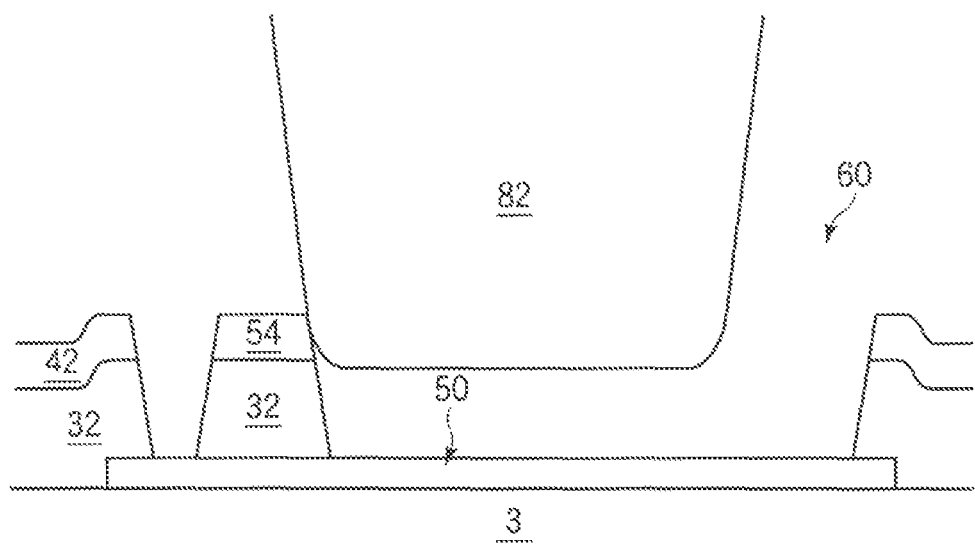
FIG. 17 is a diagram showing the TFT substrate 1 used in the liquid crystal display device according to the fifth embodiment of the invention with a section cut along a virtual line A-A' shown in FIG. 16.
Figure 18:
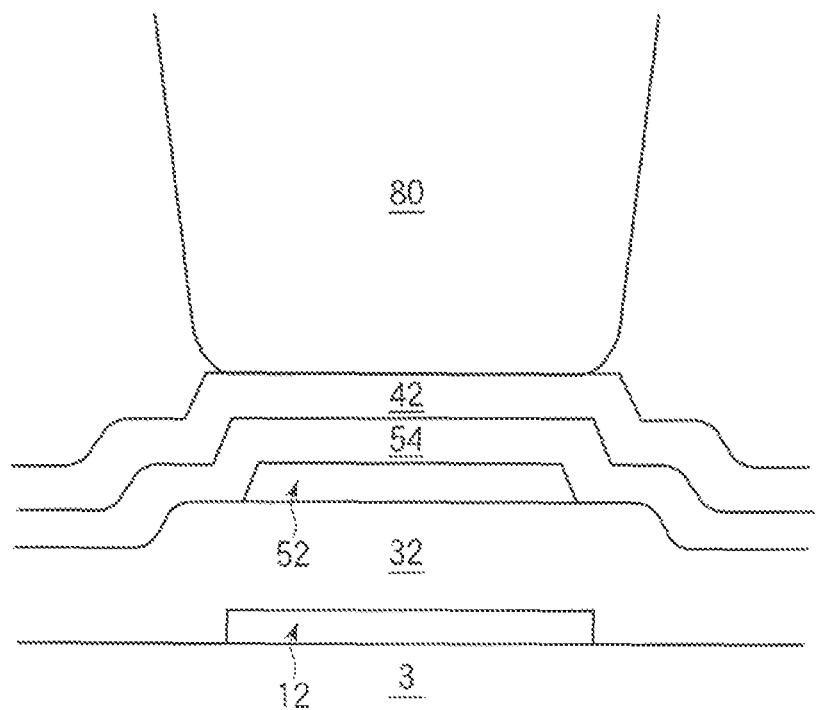
FIG. 18 is a diagram showing the TFT substrate 1 used in the liquid crystal display device according to the fifth embodiment of the invention with a section cut along a virtual line B-B' shown in FIG. 16.

A liquid crystal display device according to a fifth embodiment of the invention and a manufacturing method thereof will be described with reference to FIGS. 16 through 18. A schematic configuration of a liquid crystal display device according to the embodiment is similar to that of the liquid crystal display device according to the first embodiment; accordingly, a description thereof will be omitted. FIG. 16 partially shows a plane of a TFT substrate (second substrate) 1, which is seen through an opposite substrate (first substrate) 4 of the liquid crystal display device of the embodiment. FIG. 17 shows a section cut along a virtual line A-A' shown in FIG. 16. FIG. 18 shows a section cut along a virtual line B-B' shown in FIG. 16.

As shown in FIGS. 16 through 18, on a glass substrate 3 as a transparent insulating substrate, directly or as needs arise after a protective film such as SiOx is formed, for instance, Al or an Al alloy (not shown in the drawing) with a film thickness of for instance 130 nm and Ti or a Ti alloy (not shown in the drawing) with a film thickness of for instance 70 nm are layered in this order over an entire surface by means of the sputtering method to form a metal layer having a thickness of substantially 200 nm. As the refractory metal layer, other than Ti, for instance, Cr, Mo, Ta, W and alloys thereof can be used. Furthermore, as the Al alloy, materials where Al contains at least one of Nd, Si, Cu, Ti, W, Ta and Sc can be used.

Subsequently, after a resist layer is formed over an entire surface, a first mask (photomask or reticle, hereinafter generically referred to as mask) is used to expose to form a resist mask, followed by applying the dry etching with a chlorine-based gas to form a gate bus line 6 and a storage capacitor bus line 12 as well as a first columnar spacer receiving pattern 50.

In the next place, for instance a silicon nitride film (SiN) is layered by means of the plasma CVD method over an entire surface of the substrate at a thickness of substantially 400 nm, and thereby, an insulating film 32 that is a gate insulating film immediately above the gate bus line 6 and an interlayer insulating film in a remaining region is formed. In what follows, depending on a site where the insulating film 32 is layered, the insulating film 32 is called a gate insulating film 32 or simply an insulating film 32. Subsequently, for instance, an amorphous silicon (a-Si) layer (not shown in the drawing) for forming an operating semiconductor layer (not shown in the drawing) is layered, by means of the plasma CVD method, over an entire surface of the substrate at a thickness of substantially 130 nm. Furthermore, in order to form an ohmic contact layer (not shown in the drawing), for instance, an $N^+$ a-Si layer (not shown in the drawing) is layered, by means of the plasma CVD method, over an entire surface of the transparent glass substrate 3 at a thickness of substantially 30 nm.

Then, a photoresist is coated over an entire surface by means of the spin coat method, followed by exposing with a mask from a forward direction, and thereby a resist pattern where only on the gate electrode 29 and a columnar spacer receiving pattern region of the storage capacitor bus line 12 a resist layer remains is formed. With the resist pattern as an etching mask, an ohmic contact layer and an operating semiconductor layer are dry etched with a fluorine-based gas, and thereby a channel/island 29 and a second columnar spacer receiving pattern 52 are formed.

In the next place, in order to form a source electrode 30, a drain electrode 28, a storage capacitor electrode 38, a drain bus line 8 and a third columnar spacer receiving pattern 54, for instance, Mo (or Mo alloy)/Al (or Al alloy)/Mo (or Mo alloy) are layered respectively with thicknesses of 20 nm/200 nm/40 nm by means of the sputtering method. As a refractory metal layer, other than Mo, for instance, Cr, Mo, Ta, W and alloys thereof can be used.

Then, over an entire surface of the substrate, a photoresist layer is formed, followed by exposing a resist with a third mask, further followed by developing, and thereby the resist layer is patterned. With the patterned resist layer as an etching mask, the Mo (or Mo alloy)/Al (or Al alloy)/Mo (or Mo alloy) are wet-etched with a mixed solution of acetic acid, nitric acid and phosphoric acid, and thereby the drain bus line 8, the drain electrode 28, the source electrode 30, the storage capacitor electrode 38 and the third columnar spacer receiving pattern 54 are formed.

Subsequently, the dry etching is applied with a fluorine-based gas to the ohmic contact layer and operating semiconductor layer to etch the ohmic contact layer and half etch the operating semiconductor layer to separate a channel, and thereby a TFT 2 is formed.

In the next place, over an entire surface of the substrate, for instance, a silicon nitride film (SiN) is formed by means of the plasma CVD method at a film thickness of substantially 300 nm. Subsequently, with a fourth mask, a resist is exposed on a top layer of a source electrode 30 pad, a top layer of the storage capacitor electrode 38, a top layer of a terminal, a top layer of terminal reconnecting portion and the first columnar spacer receiving pattern 50, followed by developing to pattern the resist layer. With this as a mask, the dry etching is applied with a fluorine-based gas to remove a final protective film 42 and the insulating film 32, and thereby contact holes 46 and 48 are formed. Furthermore, as shown in FIGS. 16 and 17, on the first columnar spacer receiving pattern 50, while leaving a third columnar spacer receiving pattern 54 and an insulating film 32 both formed in rectangular parallelepiped with trapezoidal section, a columnar spacer receiving hole (columnar spacer periphery portion) 60 is formed. Thus, inside of the columnar spacer receiving hole 60, a projected structure having an isolated pattern, which is made of the first and the third columnar spacer receiving patterns 50 and 54 and the insulating film 32, is formed. The columnar spacer receiving hole 60 is formed so as to be higher than the projected structure. As shown in FIG. 16, in a plane of the TFT substrate 1, the projected structures are disposed at the same frequency in an up and down direction and right and left direction of the columnar spacer 82.

Furthermore, on the storage capacitor bus line 12 as well, a projected structure made of the second and the third columnar spacer receiving patterns 52 and 54, the storage capacitor bus line 12, the insulating film 32 and the final protective film 42 is formed. The projected structure is formed into a shape different from that of the projected structure formed inside of the columnar spacer receiving hole 60. The projected structures and the columnar spacer receiving hole 60 are formed in the TFT process.

Subsequently, over an entire surface of the substrate, an ITO film (thickness: 70 nm) for forming a pattern of a pixel electrode 10 made of ITO that is a transparent oxide conductive material is formed by means of a thin film formation method such as the sputtering method, followed by forming a resist mask having a predetermined pattern, further followed by applying the wet etching with an oxalic acid base etchant, and thereby a pixel electrode 10 electrically connected through the contact holes 46 and 48 to the source electrode 30 and the storage capacitor electrode 48 is formed. Thereafter, the heat treatment is applied in the range of 150 to 230° C. and preferably at 200° C. Further thereafter, in the liquid crystal display panel formation process, a TFT substrate 1 and an opposite substrate 4 are adhered so that, as shown in FIG. 17, the columnar spacer 82 may come into contact with a side surface of the third columnar spacer receiving pattern 54 within the columnar spacer receiving hole 60 and, as shown in FIG. 18, the columnar spacer 80 may come into contact with a projected structure made of the second and the third columnar spacer receiving patterns 52 and 54 and the like. The columnar spacer 80 comes into contact with the projected structure made of the second and the third columnar spacer receiving patterns 52 and 54 and the like. However, the columnar spacer 82 does not come into contact with the first columnar spacer receiving pattern 50 in a height direction (Z direction) because the first columnar spacer receiving pattern 50 is low.

The columnar spacer 82 is disposed inserted in the columnar spacer receiving hole 60 and brought into contact with the projected structure made of the first and the third columnar spacer receiving patterns 50 and 54 and the like. On the other hand, the columnar spacer 80 is disposed brought into contact with the projected structure made of the second and the third columnar spacer receiving patterns 52 and 54 and the like. The projected structures made of the first and the third columnar spacer receiving patterns 50 and 54 and the like, in FIG. 16, are disposed at the same frequency in an up and down direction and right and left direction in a plane of the TFT substrate 1; accordingly, even when the liquid crystal display panel is surface pressed, both substrates 1 and 4 are hardly displaced; accordingly, the light leakage can be reduced very low. Thereby, since problems such as the image lag and deterioration of the contrast owing to the light leakage can be overcome, a high quality liquid crystal display device can be obtained.

Sixth Embodiment

Figure 19:
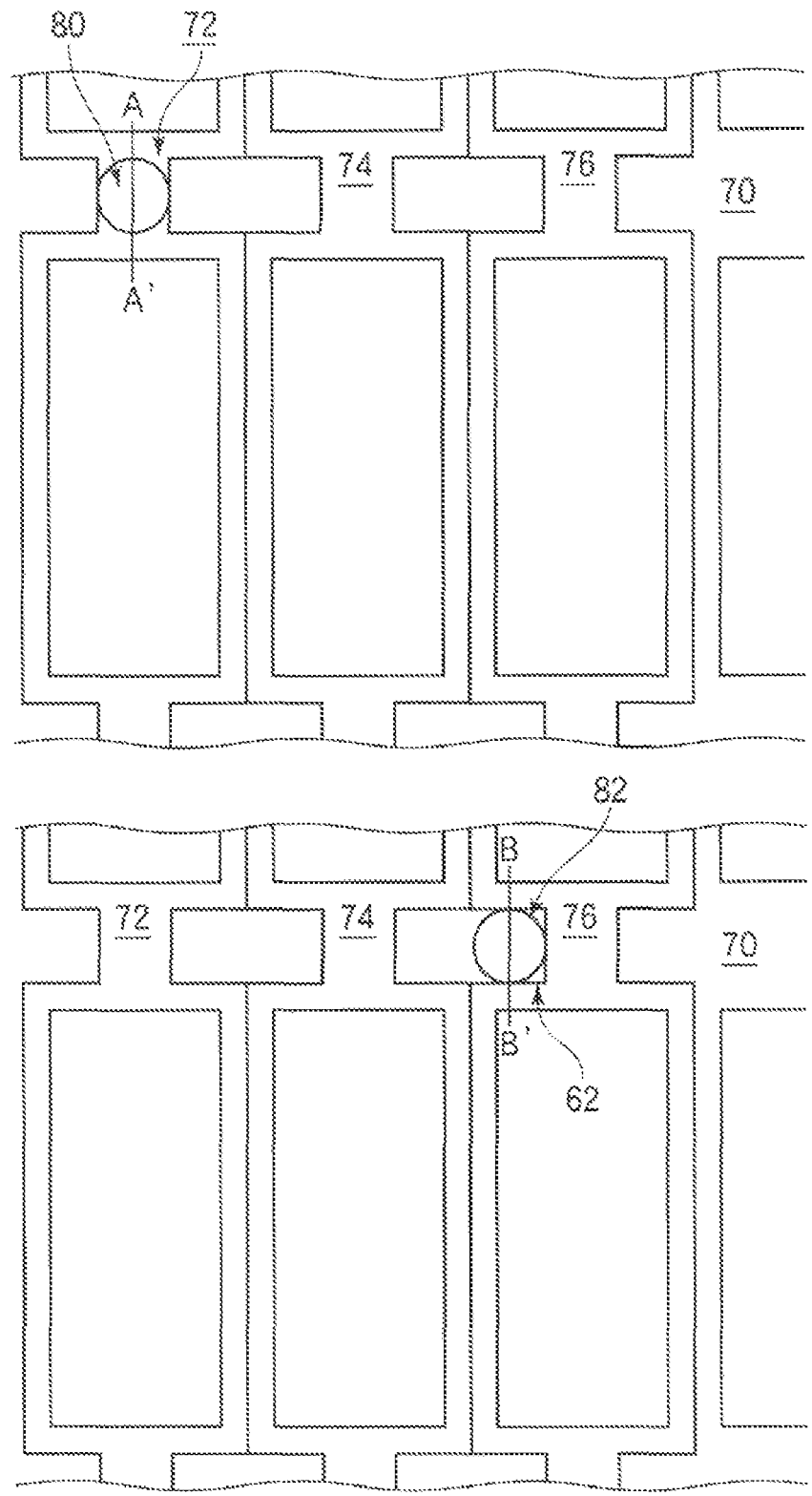
FIG. 19 is a diagram partially showing a plane of an opposite substrate 4 used in a liquid crystal display device according to a sixth embodiment of the invention.
Figure 20:
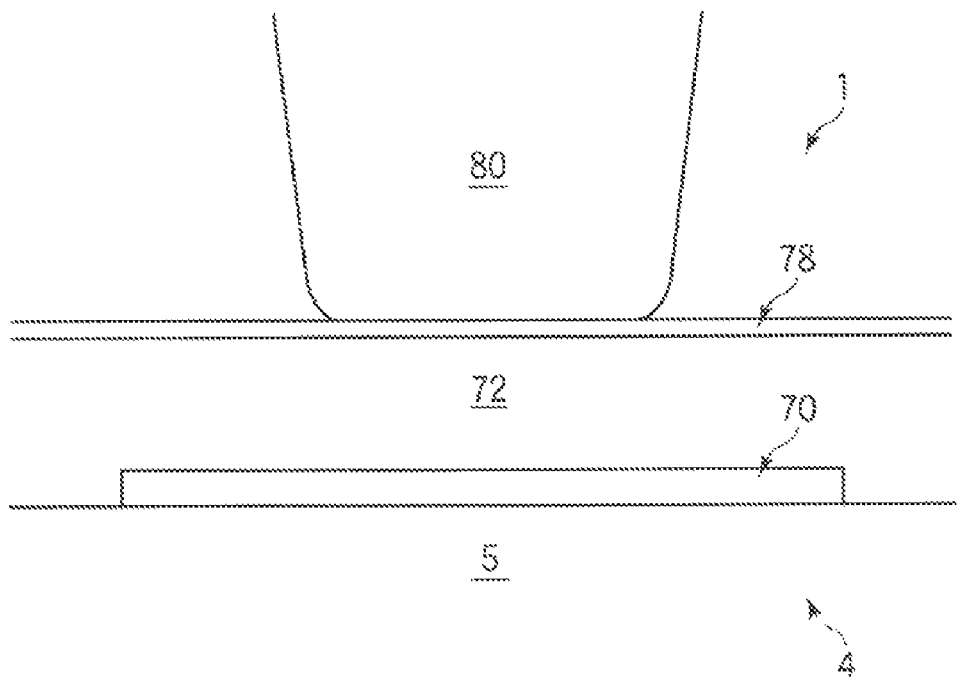
FIG. 20 is a diagram showing the opposite substrate 4 used in the liquid crystal display device according to the sixth embodiment of the invention with a section cut along a virtual line A-A' shown in FIG. 19.
Figure 21:
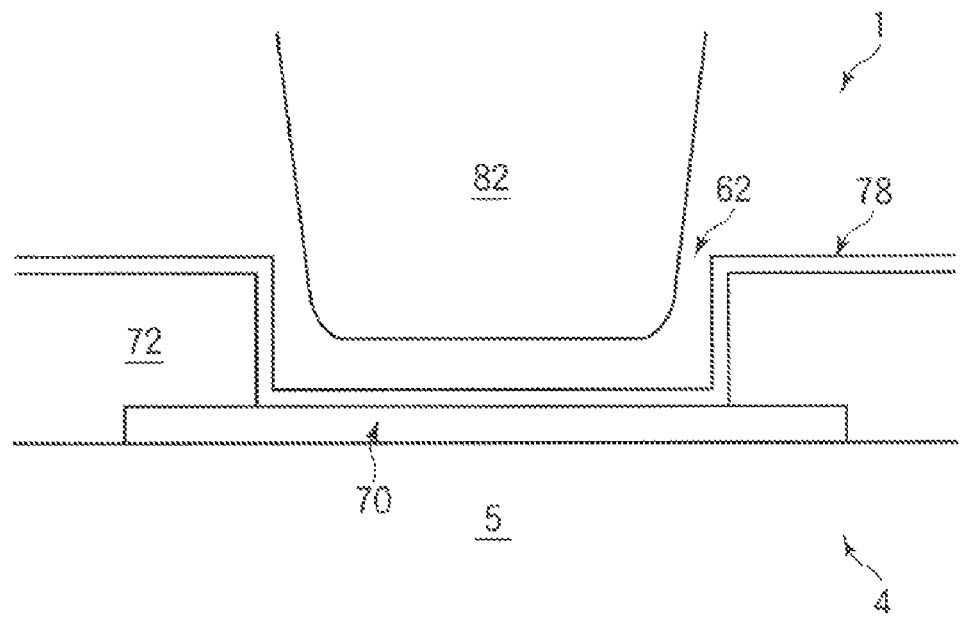
FIG. 21 is a diagram showing the opposite substrate 4 used in the liquid crystal display device according to the sixth embodiment of the invention with a section cut along a virtual line B-B' shown in FIG. 19.

A liquid crystal display device according to a sixth embodiment of the invention and a manufacturing method thereof will be described with reference to FIGS. 19 through 21. A schematic configuration of a liquid crystal display device according to the embodiment is similar to that of the liquid crystal display device according to the first embodiment; accordingly, a description thereof will be omitted. FIG. 19 partially shows a plane of an opposite substrate (second substrate) 4, which is seen through a TFT substrate (first substrate) 1 of the liquid crystal display device of the embodiment. FIG. 20 shows a section cut along a virtual line A-A' shown in FIG. 19. FIG. 21 shows a section cut along a virtual line B-B' shown in FIG. 19.

As shown in FIGS. 19 through 21, on a glass substrate 5 as a transparent insulating substrate, for instance, Cr or a Cr alloy is layered, by means of the sputtering method, over an entire surface thereof at a film thickness of, for instance, 100 nm. Subsequently, after a resist layer is formed over an entire surface, a first mask (photomask or reticle, hereinafter generically referred to as mask) is used to expose to form a resist mask. In the next place, the Cr film is wet etched. As an etching solution, an aqueous solution where, for instance, 15% by weight of ammonium cerium (IV) nitrate, 15% by weight of nitric acid and 5% by weight of ammonium nitrate are mixed is used to form a BM (black matrix) 70 that demarcates a pixel region and that shields light.

Subsequently, a red resin CF layer 72, a green resin CF layer 74 and a blue resin CF layer 76 are formed respectively. For instance, an acrylic negative photosensitive resin in which a red (R) pigment is dispersed is coated, by use of a spin coater or a slit coater and the like, over an entire surface of the glass substrate 5 at a film thickness of, for instance, 170 nm. Then, according to proximity exposure with a large mask, a pattern is exposed so that on a predetermined plurality of rows the resin may remain. In the next place, an alkaline developer such as KOH is used to develop, and thereby a red resin CF layer 72 and a columnar spacer receiving hole (columnar spacer receiving portion) 62 are formed. Thus, the columnar spacer receiving hole 62 is formed in the CF formation process.

Similarly of green (G) and blue (B), an acrylic negative photosensitive resin where a green (G) or blue (B) pigment is dispersed is coated and patterned, and thereby in adjacent rows of the red resin CF layer 72 R, a green resin CF layer 74, a blue resin CF layer 76 and a columnar spacer receiving hole 62 are formed.

In the next place, an ITO film (thickness: 100 nm) for use in a common electrode 78 made of ITO that a transparent oxide conductive material is formed, by means of a thin film formation method such as the sputtering method, over an entire surface of the substrate. Accordingly, an inner wall of the columnar spacer receiving hole 62 is formed of the common electrode 78. Thereafter, in the liquid crystal panel formation process, the opposite substrate 4 and the TFT substrate 1 are adhered so that, as shown in FIG. 20, the columnar spacer 80 may be brought into contact with the common electrode 78 and, as shown in FIG. 21, the columnar spacer 82 may meet the columnar spacer receiving hole 62. The columnar spacer 80 comes into contact with the common electrode 78 on the side of the opposite substrate 4; however, since the columnar spacer receiving hole 62 is low in height, the columnar spacer 82 does not come into contact therewith in a height direction (Z direction).

When the columnar spacer 80 formed on the TFT substrate 1 is brought into contact with the common electrode 78 on the opposite substrate 4, a predetermined cell gap of the liquid crystal display panel is maintained, and, when the columnar spacer 82 formed on the TFT substrate 1 is inserted in the columnar spacer receiving hole 62 formed on the opposite substrate 4, even when the liquid crystal display panel is surface pressed, both substrates 1 and 4 are hardly displaced; accordingly, the light leakage can be reduced very low. Thereby, since problems such as the image lag and deterioration of the contrast owing to the light leakage can be overcome, a high quality liquid crystal display device can be obtained.

What is claimed is:

1. A liquid crystal display device comprising:
   a first substrate and a second substrate that are disposed facing each other;
   a liquid crystal sealed between the first and the second substrates;
   a columnar spacer disposed on the first substrate to maintain a cell gap between the first and the second substrates;
   a projected structure that is provided on the second substrate and is provided with columnar spacer receivers and with an insulating film arranged between the columnar spacer receivers; and
   a columnar spacer periphery portion that is disposed on a periphery of the columnar spacer and provided on the second substrate at a height higher than a columnar spacer contact portion; wherein
   the projected structure comes into contact with the columnar spacer and is buried in a portion of the columnar spacer such that no portion of the columnar spacer periphery portion comes into contact with the columnar spacer; and
   the projected structure is provided at a height that is higher than a height of the columnar spacer periphery portion.

2. The liquid crystal display device according to claim 1, wherein the columnar spacer periphery includes at least one layer of a gate layer, a gate insulating film layer, a semiconductor layer, a contact layer, a drain layer, a passivation film layer, an overcoat layer, a pixel electrode, a reflection/diffusion layer, and a reflection electrode layer, all of which are disposed on the second substrate, or includes with at least one layer of a black matrix layer, a CF layer, a common electrode layer, and a domain control projection layer, all of which are disposed on the second substrate.

3. The liquid crystal display device according to claim 1, wherein the columnar spacer periphery portion is a predetermined bus line or a predetermined electrode that is provided on the second substrate.

4. The liquid crystal display device according to claim 1, wherein the columnar spacers are disposed at at least two different positions of a pattern of the second substrate.

5. A liquid crystal display device comprising:
   a first substrate and a second substrate that are disposed facing each other;
   a liquid crystal sealed between the first and the second substrates;
   a first columnar spacer disposed on the first substrate to maintain a cell gap between the first and the second substrates;
   a first projected structure that is provided on the second substrate and provided with a columnar spacer receiver that comes into contact with the first columnar spacer;
   a second columnar spacer that is provided on the first substrate and that does not come into contact with a second projected structure that is formed on the second substrate, the second projected structure is provided with a columnar spacer receiver and is disposed facing the second columnar spacer; and
   a columnar spacer periphery portion that is provided on the second substrate to be at a height higher than a tip end portion of the second columnar spacer and is disposed on the periphery of the second columnar spacer; wherein
   the columnar spacer periphery portion overlaps a portion of the columnar spacer receiver of the second projected structure.

6. The liquid crystal display device according to claim 5, wherein the columnar spacer periphery portion has a through-hole structure.

7. A manufacturing method of a liquid crystal display device that includes a first substrate and a second substrate that are disposed facing each other, a liquid crystal sealed between the first and the second substrates, a columnar spacer disposed on the first substrate so as to maintain a cell gap between the first and the second substrates, and a projected structure that is provided on the second substrate and is provided with columnar spacer receivers, comprising:
   forming, on the second substrate in a TFT formation process or a CF formation process, an insulating film that is disposed between columnar spacer receivers, and a columnar spacer periphery portion that is disposed in the periphery of the columnar spacer and provided on the second substrate at a height higher than a columnar spacer contact portion; wherein
   the columnar spacer comes into contact with the projected structure, no portion of the columnar spacer periphery portion comes into contact with the columnar spacer, and the projected structure is buried in a portion of the columnar spacer and
   the projected structure is provided at a height that is higher than a height of the columnar spacer periphery portion.

* * * * *